US007525571B2

(12) United States Patent
Ando et al.

(10) Patent No.: US 7,525,571 B2
(45) Date of Patent: Apr. 28, 2009

(54) IMAGE PROCESSING SYSTEM, IMAGE PICKUP DEVICE AND METHOD, AND RECORDING MEDIUM USING REPRESENTATIVE IMAGE DATA

(75) Inventors: Masaki Ando, Chiba (JP); Hiroshi Masuda, Chiba (JP); Osamu Date, Tokyo (JP)

(73) Assignee: Sony Corporation (JP)

( * ) Notice: Subject to any disclaimer, the term of this patent is extended or adjusted under 35 U.S.C. 154(b) by 460 days.

(21) Appl. No.: 10/528,723

(22) PCT Filed: Jul. 28, 2003

(86) PCT No.: PCT/JP03/09517

§ 371 (c)(1),
(2), (4) Date: Sep. 19, 2005

(87) PCT Pub. No.: WO2004/030357

PCT Pub. Date: Apr. 8, 2004

(65) Prior Publication Data

US 2006/0112413 A1 May 25, 2006

(30) Foreign Application Priority Data

Sep. 26, 2002 (JP) ............................. 2002-280709

(51) Int. Cl.
*H04N 5/225* (2006.01)

(52) U.S. Cl. .................................. 348/207.1; 348/211.1

(58) Field of Classification Search ............ 348/333.12, 348/333.05, 333.02, 239, 231.3, 231.2, 211.3, 348/211.1, 207.1, 207.11, 24, 21, 14.12, 348/14.02, 14.01, 552, 231.9, 211.14, 211.2, 348/207.99; 455/556.1, 575.1
See application file for complete search history.

(56) References Cited

U.S. PATENT DOCUMENTS 5,724,579 A * 3/1998 Suzuki .................... 707/104.1

(Continued)

FOREIGN PATENT DOCUMENTS

JP 7-245723 A 9/1995

(Continued)

*Primary Examiner*—Lin Ye
*Assistant Examiner*—Nelson D Hernández Hernández
(74) *Attorney, Agent, or Firm*—Lerner, David, Littenberg, Krumholz & Mentlik, LLP

(57) ABSTRACT

An image processing system makes it possible to transfer a large amount of image data to another apparatus efficiently. A digital camera transfers image data to a server after transferring thumbnail image data yet to be transferred to the server. When new thumbnail image data is generated during the transfer of the image data, the transfer of the image data is stopped, and the new thumbnail image data is transferred first. Obtaining the thumbnail image data, the server displays the thumbnail images on a display, receives a request for the transfer of image data from a user, and then supplies the request to the digital camera. The digital camera transfers the image data to the server on the basis of the request.

16 Claims, 24 Drawing Sheets

U.S. PATENT DOCUMENTS

| | | | |
|---|---|---|---|
| 6,784,925 B1 * | 8/2004 | Tomat et al. | 348/207.11 |
| 6,833,863 B1 * | 12/2004 | Clemens | 348/220.1 |
| 6,957,040 B1 * | 10/2005 | Tanaka | 455/3.06 |
| 2002/0054222 A1 * | 5/2002 | Nitta et al. | 348/231 |
| 2003/0226023 A1 * | 12/2003 | Peters | 713/193 |

FOREIGN PATENT DOCUMENTS

| | | | |
|---|---|---|---|
| JP | 10-126724 A | | 5/1998 |
| JP | 10-164483 A | | 6/1998 |
| JP | 11-205517 A | | 7/1999 |
| JP | 11-355706 A | | 12/1999 |
| JP | 2000134531 A | * | 5/2000 |
| JP | 2000-341632 A | | 12/2000 |
| JP | 2001-016568 A | | 1/2001 |
| JP | 2002-009991 A | | 1/2002 |
| JP | 2002-016865 A | | 1/2002 |
| JP | 2002-111530 A | | 4/2002 |

* cited by examiner

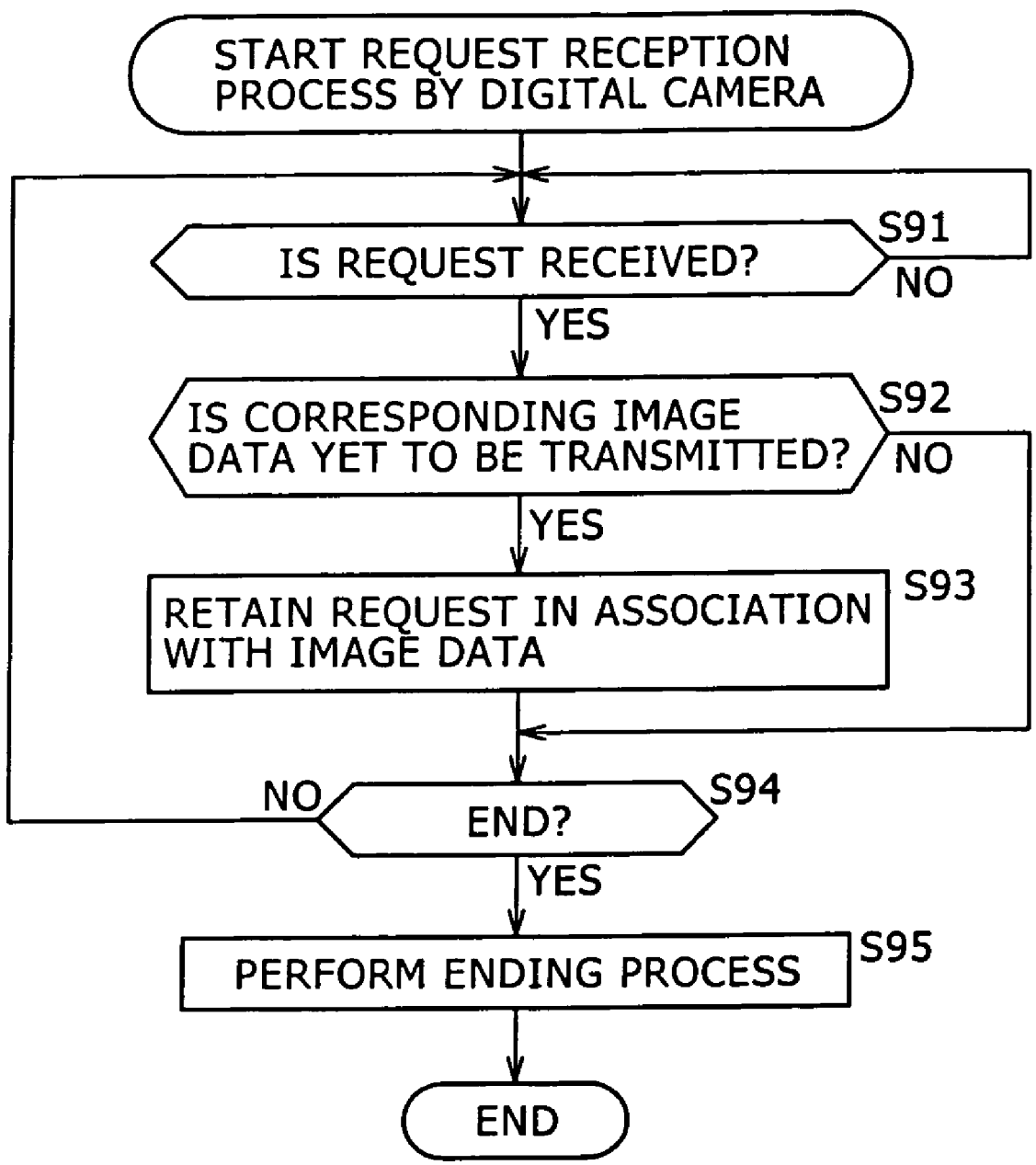

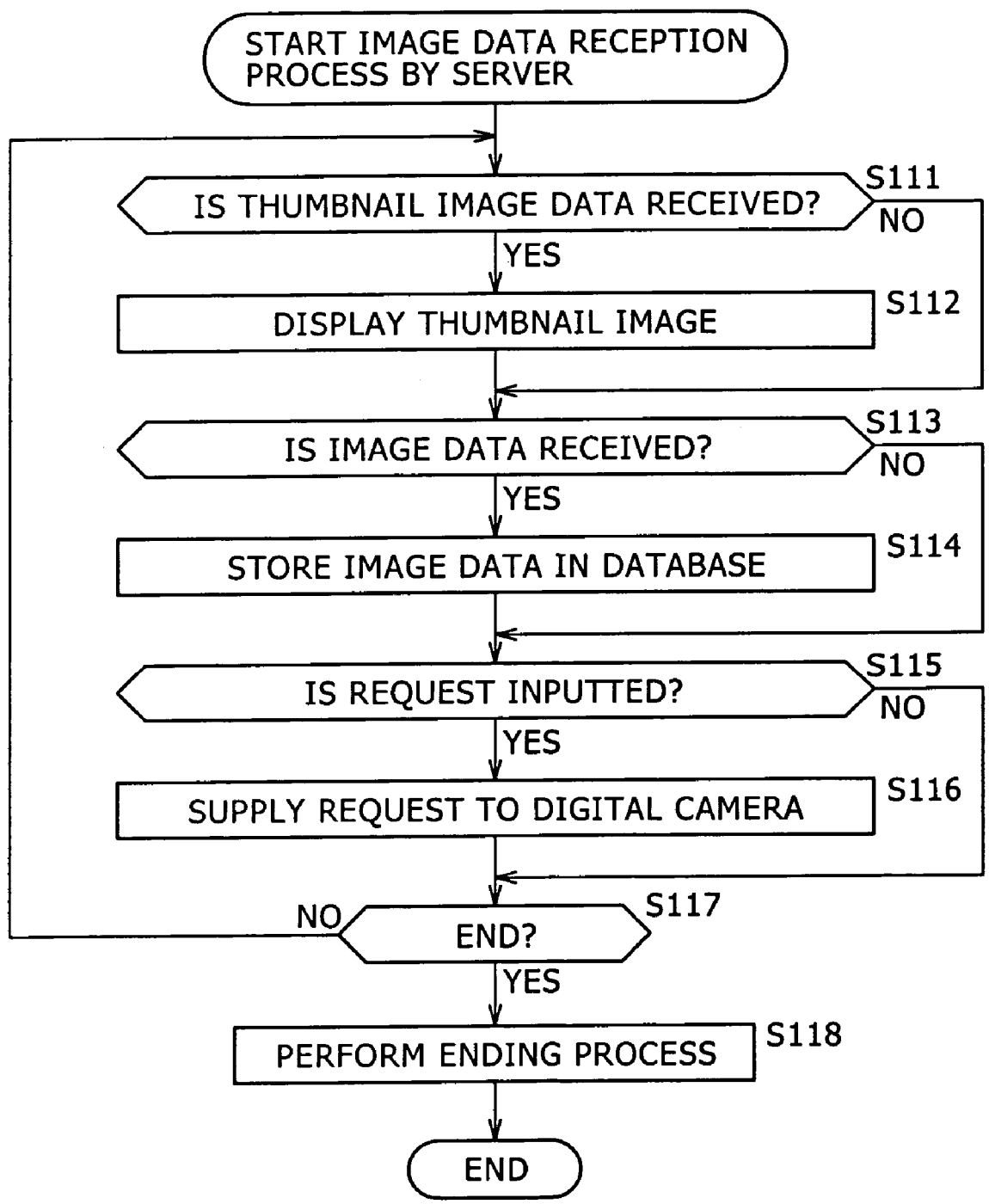

◯ MARK INDICATING THAT TRANSFER IS COMPLETED

⊘ MARK INDICATING THAT TRANSFER IS BEING PERFORMED

● MARK INDICATING THAT TRANSFER IS UNNECESSARY

▦ NEWLY ARRIVED THUMBNAIL

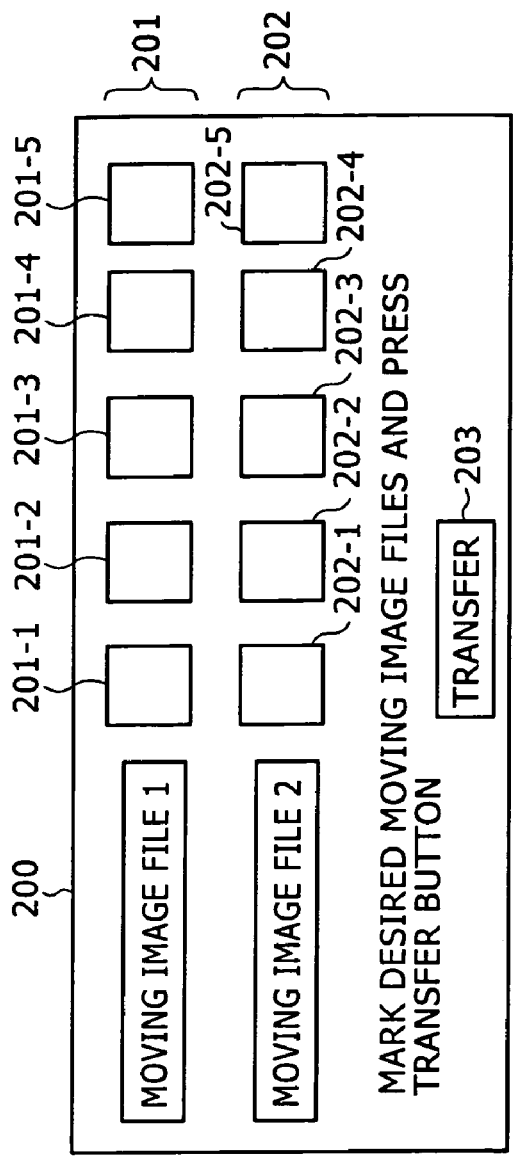
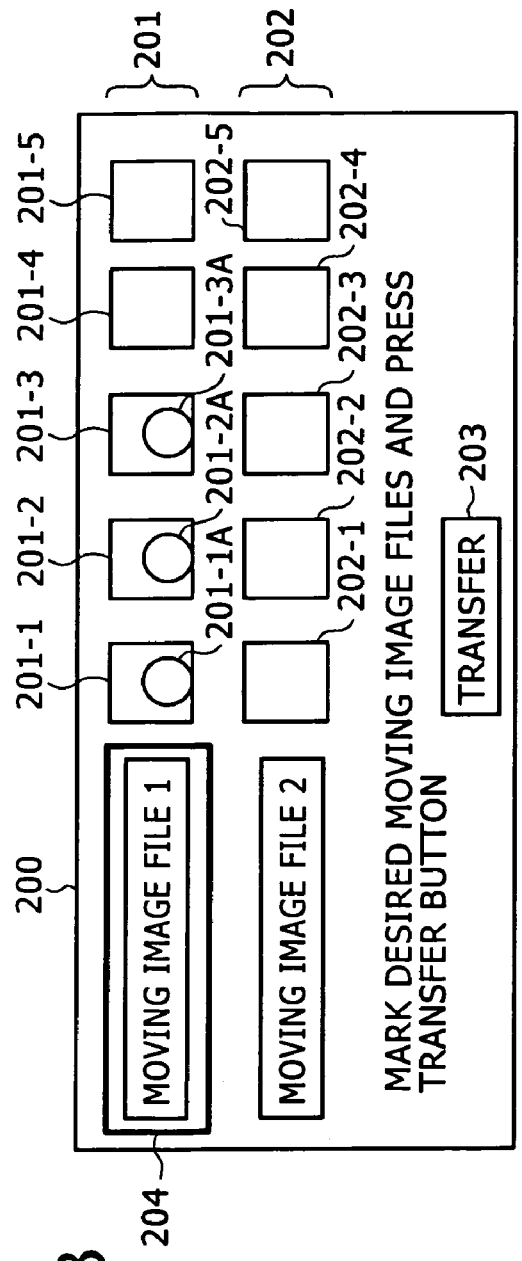
FIG. 15A
FIG. 15B

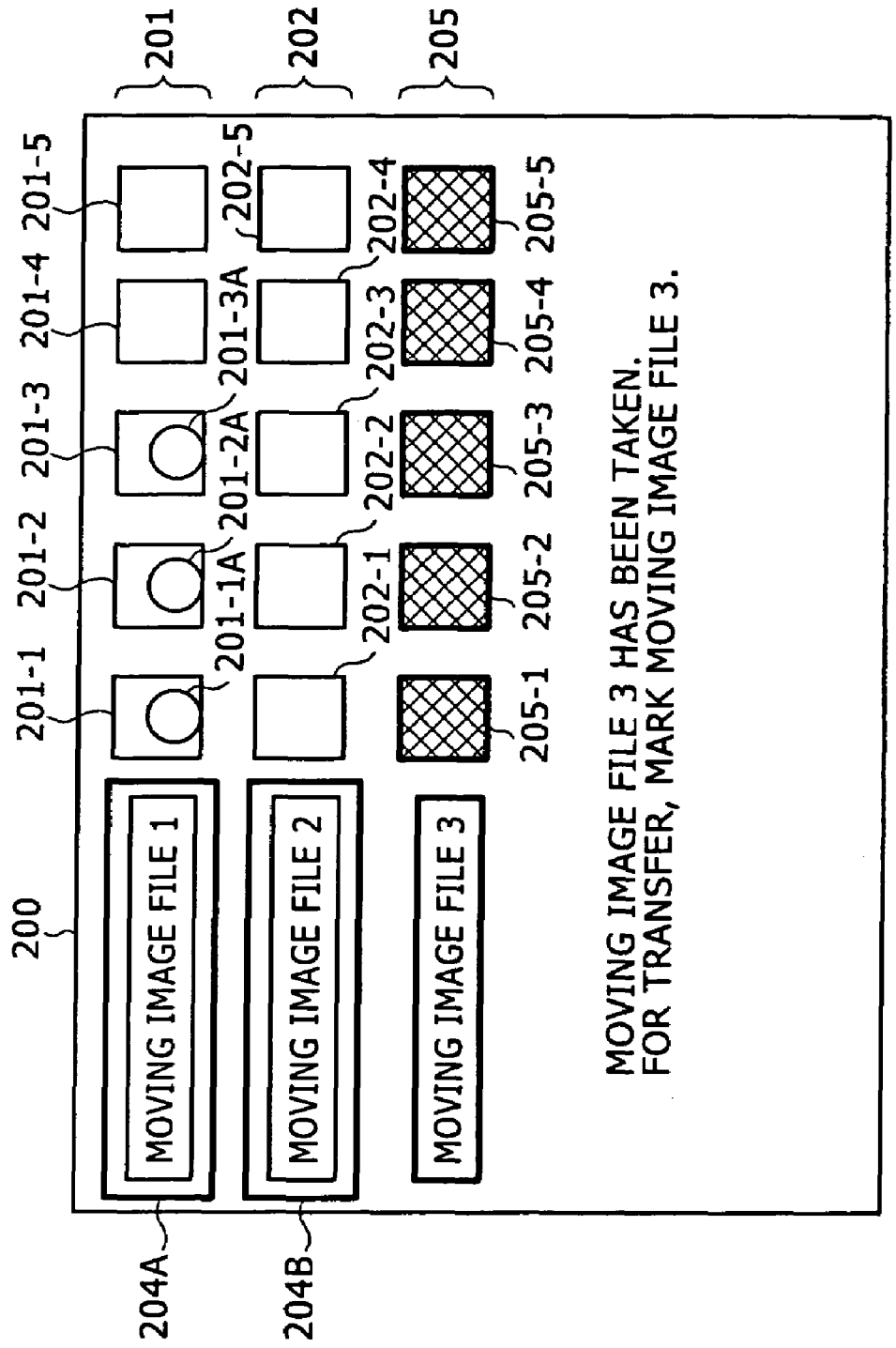

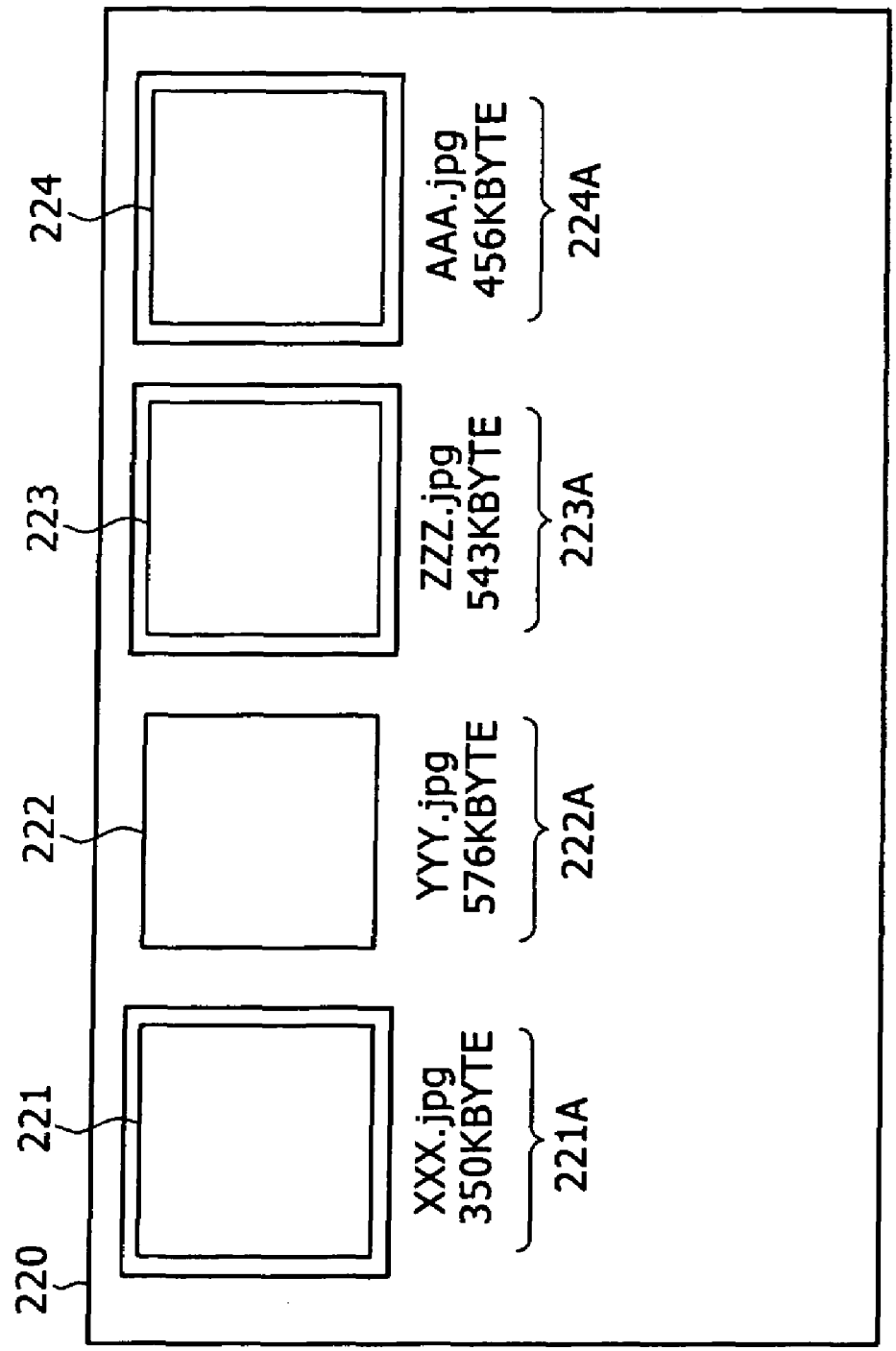

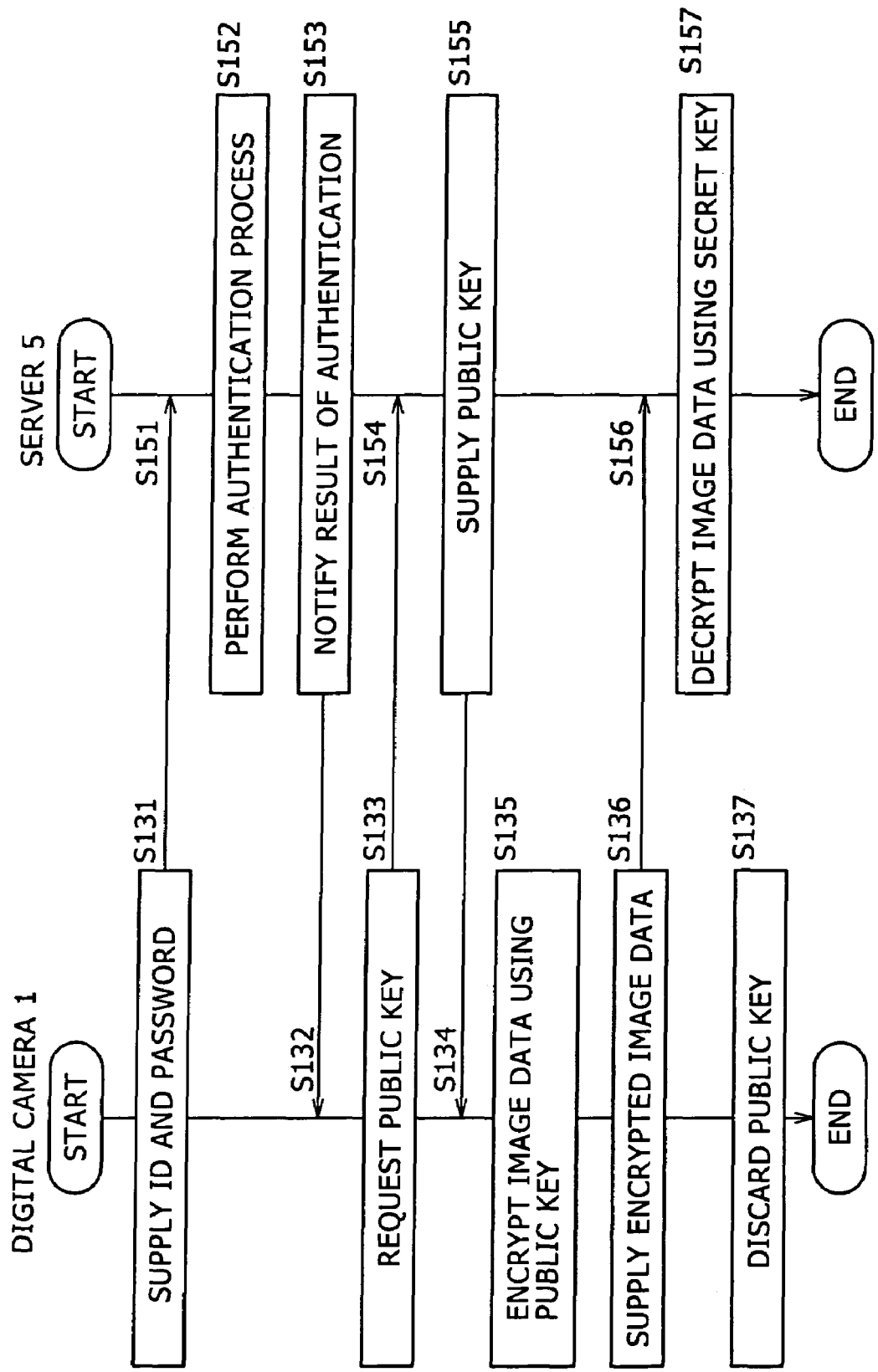

IMAGE PROCESSING SYSTEM, IMAGE PICKUP DEVICE AND METHOD, AND RECORDING MEDIUM USING REPRESENTATIVE IMAGE DATA

CROSS-REFERENCE TO RELATED APPLICATIONS

The present application is a national stage application under 35 U.S.C. § 371 of International Application No. PCT/JP2003/009517, filed Jul. 28, 2003, which claims priority from Japanese Application No. P2002-280709, filed Sep. 26, 2002, the disclosures of which are hereby incorporated by reference herein.

BACKGROUND OF THE INVENTION

1. Technical Field

The present invention relates to an image processing system, a device and a method for image pickup, a recording medium, and a program, and particularly to an image processing system, a device and a method for image pickup, a recording medium, and a program that make it possible to transfer a large amount of image data to another apparatus efficiently.

2. Background Art

Recently, with the spread of digital still cameras, the functionality of digital still cameras has been expanded by, for example, providing a communication function to digital still cameras in addition to an original image pickup function and a recording function, and thus uses of picked-up image data have been expanded.

For example, a digital still camera is devised which has a communication function, and leaves a reduced image when transmitting a main image recorded on a recording medium to another communication apparatus so that a user can easily refer to the transferred image. (See, for example, Japanese Patent Laid-Open No. 2002-(pages 6 to 10, and FIG. 2 and FIG. 3).)

Such a digital still camera enables effective use of storage capacity of the recording medium provided in the digital still camera because image data is supplied to another communication apparatus and stored in the communication apparatus, and also facilitates reference of transferred images on the digital still camera side.

However, in the above-described method, when image data obtained by picking up an image is transferred to another communication apparatus to be used by a side of the other communication apparatus, a user of the other communication apparatus cannot refer to the image until the transfer of the image data is completed.

Recent digital still cameras have higher functionality and also have an expanded storage area of a recording medium for recording image data obtained by image pickup, so that the digital still cameras can store a large amount of image data. Thus, for example, when all of the large amount of image data is to be transferred, a great amount of processing time, which increases as the free space of the recording medium is reduced, is required.

In many cases, however, the communication apparatus side to which the large amount of image data is thus transferred actually uses a part of the image data to process and print images.

When a digital still camera is used in business as, for example, by a newspaper publishing company, in particular, only a small number of images are selected for actual use with an article or the like from a large amount of images obtained by image pickup, and most of the images are discarded.

In such a case, it is desirable to be able to use images obtained by image pickup immediately. With the above-described method, however, the images cannot be referred to until transfer of a large amount of image data is completed, so that the efficiency of business can be decreased.

On the other hand, a method of reducing an amount of data to be transferred by selecting images to be transferred on a digital still camera side is conceivable. This, however, involves a complicated operation by a user of the digital still camera, thus rendering the image pickup operation inefficient.

SUMMARY OF THE INVENTION

The present invention has been made in view of the above, and it is an object of the present invention to make it possible to transfer a large amount of image data to another apparatus easily and efficiently.

According to the present invention, there is provided a first image processing system including an image pickup device for transferring image data obtained by picking up an image of a subject; and an image processing apparatus for obtaining the image data transferred from the image pickup device; wherein the image pickup device includes: image pickup means for picking up the image of the subject and generating the image data; generating means for generating representative image data representing the image data generated by the image pickup means; and supplying means for supplying the representative image data and the image data to the image processing apparatus, the representative image data being supplied preferentially before the image data; and the image processing apparatus includes: obtaining means for obtaining the representative image data and the image data supplied from the image pickup device; displaying means for displaying the representative image data obtained by the obtaining means; and storing means for storing the representative image data and the image data obtained by the obtaining means in association with each other.

According to the present invention, there is provided a second image processing system including an image pickup device for transferring image data obtained by picking up an image of a subject; an image managing apparatus for managing the image data transferred from the image pickup device; and an image processing apparatus for obtaining the image data managed by the image managing apparatus; wherein the image pickup device includes: image pickup means for picking up the image of the subject and generating the image data; generating means for generating representative image data representing the image data generated by the image pickup means; and first supplying means for supplying the representative image data and the image data to the image managing apparatus, the representative image data being supplied preferentially before the image data; the image managing apparatus includes: first obtaining means for obtaining the representative image data and the image data supplied from the image pickup device; managing means for managing the representative image data and the image data obtained by the first obtaining means in association with each other; and second supplying means for supplying the representative image data and the image data to the image processing apparatus, the representative image data being supplied preferentially before the image data; and the image processing apparatus includes: second obtaining means for obtaining the representative image data and the image data supplied from the image managing apparatus; displaying means for displaying the representative image data obtained by the second obtaining means; and storing means for storing the representative image data and the image data obtained by the second obtaining means in association with each other.

According to the present invention, there is provided an image pickup device including image pickup means for picking up an image of a subject and generating image data; generating means for generating representative image data representing the image data generated by the image pickup means; and supplying means for supplying the representative image data and the image data to another apparatus, the representative image data being supplied preferentially before the image data.

When the image pickup means generates new image data while the supplying means is supplying the image data to the other apparatus, the generating means generates new representative image data representing the new image data, and the supplying means can preferentially supply the new representative image data to the another apparatus before the image data being supplied.

The image pickup device further includes receiving means for receiving control information on supply of the image data, wherein the supplying means can supply the image data to the another apparatus based on the control information received by the receiving means.

The supplying means can supply related information on the image data to the another apparatus together with the representative image data or the new representative image data.

The image pickup device further includes receiving means for receiving a first cryptographic key supplied by the another apparatus; cryptographic key generating means for generating a second cryptographic key for encrypting the image data generated by the image pickup means; first encrypting means for generating first encrypted data by encrypting the image data generated by the image pickup means using the second cryptographic key; and second encrypting means for generating second encrypted data by encrypting the second cryptographic key using the first cryptographic key; wherein the related information on the image data can be the second encrypted data.

According to the present invention, there is provided an image pickup method including generating image data obtained by picking up an image of a subject; generating representative image data representing the generated image data; and controlling supply so as to supply the representative image data and the image data to another apparatus so that the representative image data is supplied preferentially before the generated image data.

When the image data generating step generates new image data while the generated image data is being supplied to the another apparatus, the representative image data generating step generates new image data, and the supply controlling step can control the supply so as to preferentially supply the new representative image data to the another apparatus before the image data being supplied.

The image pickup method further includes receiving control information on supply of the image data, wherein the supply controlling step can control the supply so as to supply the image data to the another apparatus based on the control information.

The supply controlling step can control the supply so as to supply related information on the image data to the another apparatus together with the representative image data or the new representative image data.

The image pickup method further includes receiving a first cryptographic key supplied by the another apparatus; generating a second cryptographic key for encrypting the generated image data; generating first encrypted data by encrypting the generated image data using the second cryptographic key; and generating second encrypted data by encrypting the second cryptographic key using the first cryptographic key; wherein the related information on the image data can be the second encrypted data.

According to the present invention, there is provided a recording medium recorded with a computer readable program for performing an image pickup method, the method including generating image data obtained by picking up an image of a subject; generating representative image data representing the generated image data; and controlling supply so as to supply the representative image data and the image data to another apparatus so that the representative image data is supplied preferentially before the generated image data.

According to the present invention, there is provided a program for making a computer perform an image pickup method, the method including generating image data obtained by picking up an image of a subject; generating representative image data representing the generated image data; and controlling supply so as to supply the representative image data and the image data to another apparatus so that the representative image data is supplied preferentially before the generated image data.

The first image processing system according to the present invention includes an image pickup device for transferring image data obtained by picking up an image of a subject; and an image processing apparatus for obtaining the image data transferred from the image pickup device; wherein the image pickup device picks up the image of the subject and generates the image data, generates representative image data representing the generated image data, and supplies the representative image data and the image data to the image processing apparatus, the representative image data being supplied preferentially before the image data; and the image processing apparatus obtains the representative image data and the image data supplied from the image pickup device, displays the obtained representative image data, and stores the representative image data and the image data in association with each other.

The second image processing system according to the present invention includes an image pickup device for transferring image data obtained by picking up an image of a subject; an image managing apparatus for managing the image data transferred from the image pickup device; and an image processing apparatus for obtaining the image data managed by the image managing apparatus; wherein the image pickup device picks up the image of the subject and generates the image data, generates representative image data representing the generated image data, and supplies the representative image data and the image data to the image managing apparatus, the representative image data being supplied preferentially before the image data; the image managing apparatus obtains the representative image data and the image data supplied from the image pickup device, manages the representative image data and the image data obtained in association with each other, and supplies the representative image data and the image data to the image processing apparatus, the representative image data being supplied preferentially before the image data; and the image processing apparatus obtains the representative image data and the image data supplied from the image managing apparatus, displays the representative image data obtained, and stores the representative image data and the image data obtained in association with each other.

The image pickup device and method and the program according to the present invention pick up an image of a subject and generate image data, generate representative image data representing the generated image data, and supply the representative image data and the image data to another apparatus, the representative image data being supplied preferentially before the image data.

BRIEF DESCRIPTION OF THE DRAWINGS

FIG. 11 is a flowchart of assistance in explaining a request reception process by the digital camera;

FIG. 12 is a flowchart of assistance in explaining an image data reception process by the server;

FIG. 15A is a schematic diagram showing a further example of the GUI screen displayed on the display of the server;

FIG. 15B is a schematic diagram showing the further example of the GUI screen displayed on the display of the server;

FIG. 16 is a schematic diagram showing the further example of the GUI screen displayed on the display of the server;

FIG. 18 is a schematic diagram showing a further example of the GUI screen displayed on the display of the server;

FIG. 19 is a timing chart of assistance in explaining a flow of a process of transferring image data encrypted by a first encryption system in the image processing system of FIG. 1;

DETAILED DESCRIPTION

Figure 1:
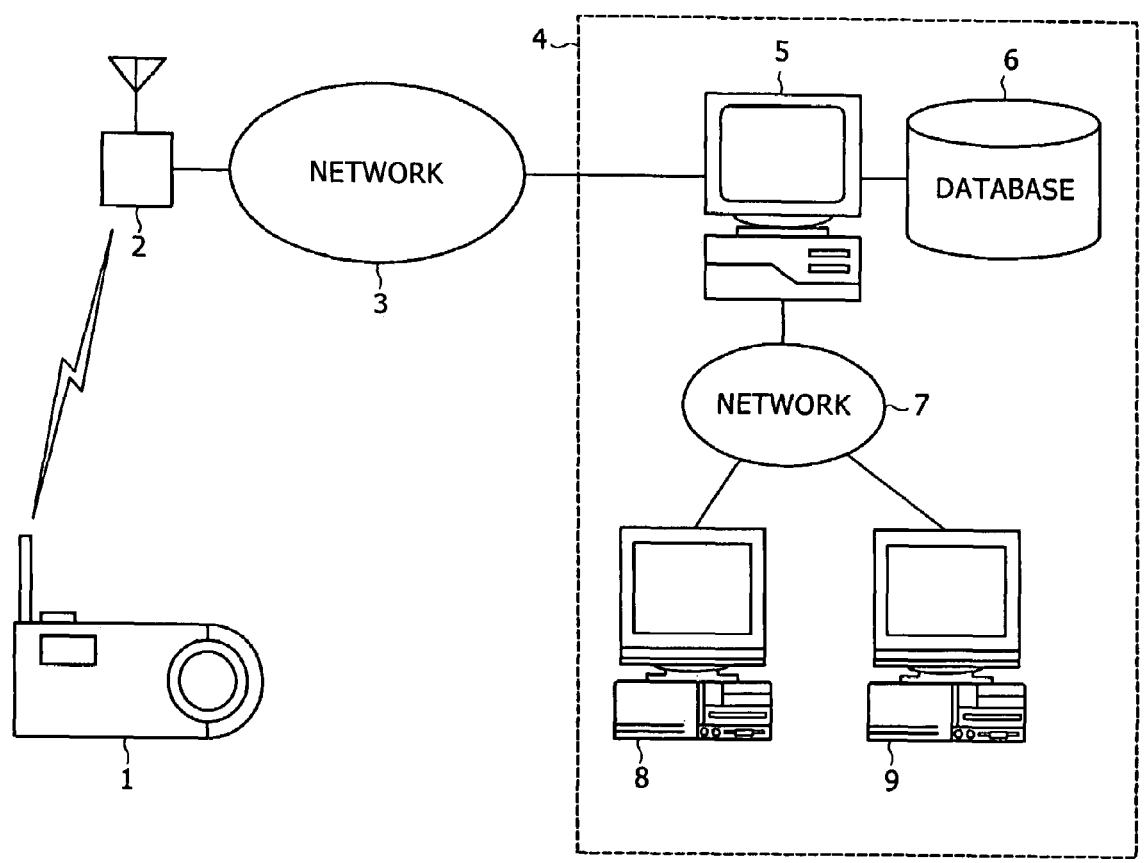
FIG. 1 is a diagram showing an example of the fundamental configuration of an image data transfer system to which the present invention is applied.

FIG. 1 is a diagram showing an example of the fundamental configuration of an image data transfer system to which the present invention is applied.

A digital camera 1 in FIG. 1 has a radio communication function. The digital camera 1 is thereby connected continuously to a network 3 typified by the Internet via a base station 2. The network 3 is also connected with a server 5 installed in a company 4, which server processes image data.

The server 5 is connected with a database 6 controlled by the server 5 and storing image data. The server 5 is also connected with a network 7 typified by a LAN (Local Area Network) or the like established in the company 4. The server 5 is thereby accessed by personal computers 8 and 9 similarly connected to the network 7.

Thus, the server 5 and the personal computers 8 and 9 can obtain and use image data stored in the database 6. The network 7 installed in the company 4 generally has a sufficiently broad band, so that the personal computers 8 and 9 can instantly obtain and use image data stored in the database 6.

The digital camera 1 records image data obtained by picking up an image of a subject on a recording medium. At this time, the digital camera 1 generates thumbnail image data corresponding to a thumbnail image as a reduced image of the obtained image.

Then, in a state of being capable of communication, the digital camera 1 first transfers thumbnail image data not transferred yet to the server 5, preset as an image data transfer destination, via the base station 2 and the network 3.

After transferring all thumbnail image data, the digital camera 1 next transfers image data recorded on the recording medium to the server 5 preset as a transfer destination, as in the case of the thumbnail image data.

It is to be noted that the transfer of thumbnail image data takes priority over the transfer of image data. Specifically, when an image pickup process is performed and new thumbnail image data is generated during the transfer of image data, the transfer of the image data is stopped, and the newly generated thumbnail image data is transferred first. When there is thereafter no thumbnail image data yet to be transferred, the transfer of the image data is resumed.

The server 5 displays a thumbnail image corresponding to thumbnail image data obtained from the digital camera 1 on a display using a GUI (Graphical User Interface) or the like. When the personal computer 8 or 9 connected to the server 5 via the network 7 requests the thumbnail image data from the server 5, the server 5 supplies the thumbnail image data obtained from the digital camera 1 to the personal computer 8 or 9 on the basis of the request to display the corresponding thumbnail image on a display of the personal computer 8 or 9 using a GUI or the like.

When image data is transferred from the digital camera 1, the server 5 stores the obtained image data in the database 6 in association with the previously transferred thumbnail image data. As described above, the image data stored in the database 6 can be used by the server 5 and the personal computers 8 and 9.

When a user of the server 5 referring to displayed thumbnail images selects a thumbnail image corresponding to image data desired to be used, the server 5 requests the digital camera 1 to transfer the image data corresponding to the thumbnail image.

When a user of the personal computer 8 or 9 displaying thumbnail images on the display similarly selects a thumbnail image, the information is supplied to the server 5. Then, the server 5 receiving the information requests the digital camera 1 to transfer the image data as described above.

Obtaining the request to transfer the image data, the digital camera 1 transfers the requested image data to the server 5 first before other image data. At normal times, image data recorded on the recording medium is transferred to the server 5 in predetermined order. When the request is obtained, however, the digital camera 1 transfers the requested image data to the server 5 first irrespective of the order.

By transferring image data as described above, even in a case where a large amount of image data is transferred, a user on the company 4 side can refer to thumbnail images even when the transfer of the image data is not completed, and further obtain specified image data first. Therefore, the image data can be used efficiently.

The digital camera 1 may transfer only image data requested by the server 5. This can greatly reduce an amount of data transferred, and also reduce a load of image data transfer on each apparatus and each network.

Figure 2A:
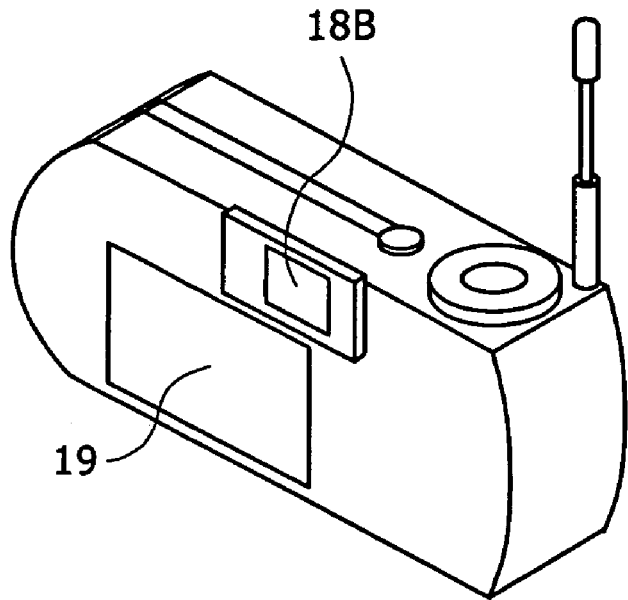
FIG. 2A is a perspective view of an example of the external appearance of a digital camera in FIG. 1.
Figure 2B:
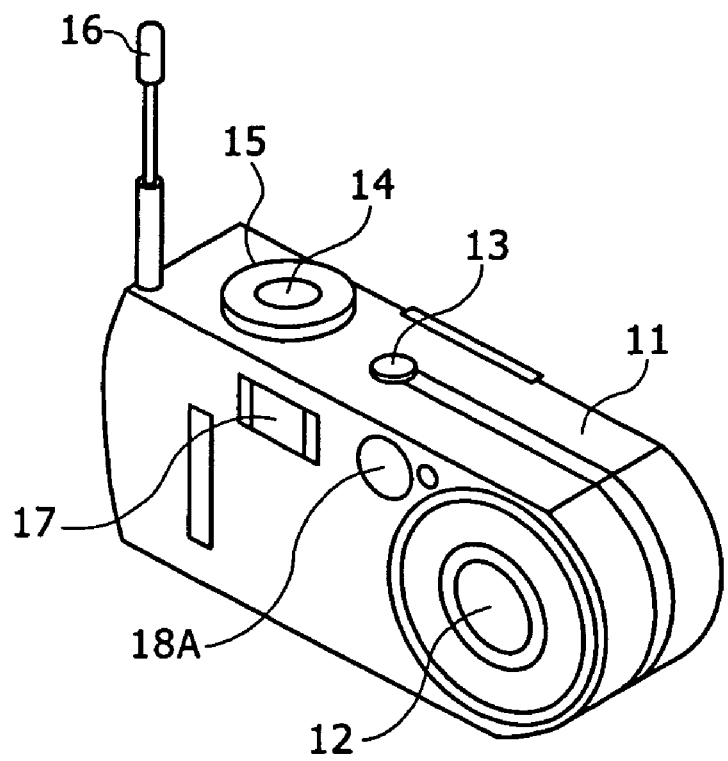
FIG. 2B is a perspective view of an example of the external appearance of the digital camera in FIG. 1.

FIG. 2A and FIG. 2B are perspective views of an example of the external appearance of the digital camera 1 in FIG. 1.

As shown in FIG. 2B, a front side and a top part of a casing 11 of the digital camera 1 are, for example, provided with: a lens part 12 for capturing an image of a subject; a power supply switch 13 for turning on and off the main power supply by operation of a user; a shutter button 14 for giving an instruction to start a process of capturing the image of the subject; a mode setting knob 15 operated by the user to input an instruction for setting a photographing condition, selecting a function to be used, and the like; an antenna 16 for transmitting and receiving image data and other data; a strobe 17 for irradiating the subject with fill light; and an optical finder 18A used by the user to check an image pickup range at the time of image pickup.

In addition, as shown in FIG. 2A, a back side of the casing 11 has: an optical finder 18B, which is a side of the optical finder 18A which side is viewed by the user; and an LCD (Liquid Crystal Display) 19 serving as a display unit for displaying an image obtained by picking up an image of a subject.

Figure 3:
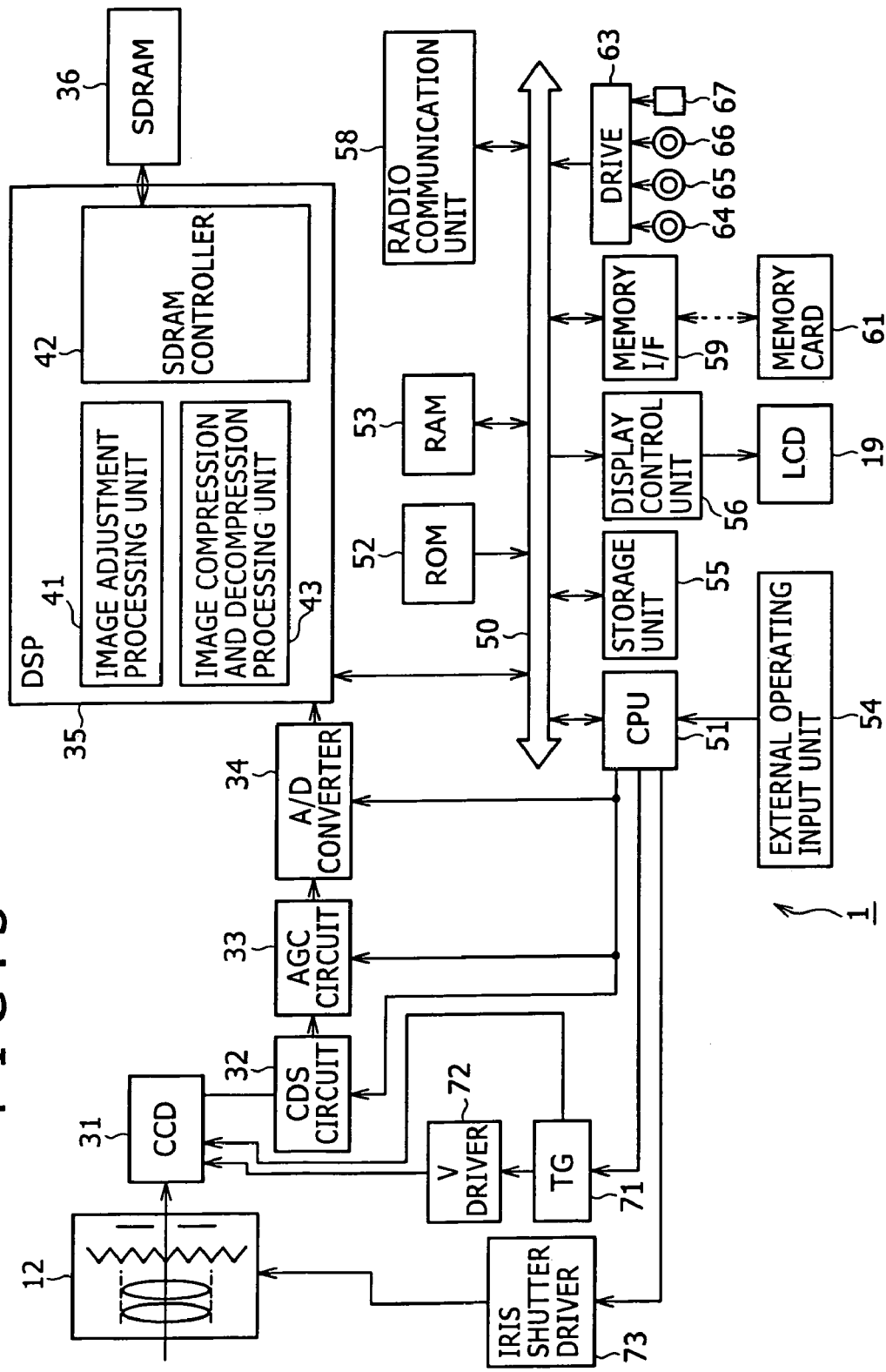
FIG. 3 is a block diagram showing an example of the internal configuration of the digital still camera in FIG. 1.

FIG. 3 is a block diagram showing an example of the internal configuration of the digital camera 1 in FIG. 1.

Light from a subject not shown in the figure enters a CCD (Charge Coupled Device) 31 via the lens part 12 formed by lenses, a diaphragm mechanism and the like to be subjected to photoelectric conversion.

An image signal output by the CCD 31 is supplied to a CDS circuit (Correlated Double Sampling circuit) 32. The CDS circuit 32 subjects the input signal to correlated double sampling to thereby remove a noise component, and then outputs the signal to an AGC circuit (Automatic Gain Control circuit) 33. The AGC circuit 33 adjusts a gain of the input signal, and thereafter outputs the signal to an A/D (Analog/Digital) converter 34. The A/D converter 34 converts the input analog signal into a digital signal, and then outputs the digital signal to a DSP (Digital Signal Processor) 35.

The DSP 35 generates a control signal used for AF (Auto Focus), AE (Auto Exposure), and AWB (Auto White Balance) on the basis of the input signal by an image adjustment processing unit 41 included in the DSP 35, and then supplies the control signal to a CPU (Central Processing Unit) 51 via a bus 50. Also, the DSP 35 generates compressed image data by an image compression and decompression processing unit 43 included in the DSP 35 by compressing the input image data by a predetermined compression and decompression system such as, for example, a JPEG (Joint Photographic Expert Group) system while temporarily retaining an image signal in an SDRAM 36 controlled by an SDRAM (Synchronous Dynamic Random Access Memory) controller 42 included in the DSP 35. In addition, the DSP 35 generates thumbnail image data corresponding to the image data, and adds the thumbnail image data to the corresponding compressed image data. Further, the DSP 35 can decompress compressed image data supplied from a storage unit 55 or the like by the image compression and decompression processing unit 43 included in the DSP 35.

The compressed image data generated by the image compression and decompression processing unit 43 is supplied to a RAM (Random Access Memory) 53 or the like via the bus 50 to be retained. The compressed image data is thereafter supplied to the storage unit 55 to be recorded in a semiconductor memory, a hard disk or the like, supplied to a memory card 61 connected to a memory I/F 59 to be recorded in the memory card 61, or supplied to a radio communication unit 58 to be transferred to another apparatus. It is to be noted that when the compressed image data is transferred to another apparatus via the radio communication unit 58, thumbnail image data attached to the compressed image data is transferred first.

The CPU 51 controls various parts and performs various processes according to a program stored in a ROM (Read Only Memory) 52 or a program loaded from the storage unit 55 formed by a flash memory or the like, into the RAM 53. The RAM 53 also stores, for example, data necessary for the CPU 51 to perform various processes as required.

The CPU 51 is connected with an external operating input unit 54 for receiving an operation by the user. The external operating input unit 54 includes the power supply switch 13, the shutter button 14, the mode setting knob 15 and the like as described above, as well as various buttons, dials, knobs, and a touch panel (none of the buttons are shown) and the like. The external operating input unit 54 is operated by the user, thereby receives an instruction from the user, and then supplies the instruction information to the CPU 51. The CPU 51 performs various processes on the basis of the instruction information.

The CPU 51, the ROM 52, and the RAM 53 are interconnected via the bus 50. The bus 50 is also connected with the storage unit 55 formed by a nonvolatile semiconductor memory, a hard disk or the like, a display control unit 56 for controlling an image displayed on the LCD 19, the memory I/F (InterFace) 59 in which the memory card 61 or the like is mounted, and the radio communication unit 58 that performs radio communication with the base station 2 and is, for example, controlled by the CPU 51 to supply thumbnail image data, compressed image data and the like stored in the storage unit 55 to the server 5 via the network 3.

The display control unit 56 includes a VRAM (Video Random Access Memory) not shown in the figure. The display control unit 56 stores image data decompressed by the DSP 35 in the VRAM included in the display control unit 56. The display control unit 56 displays on the LCD 19 an image corresponding to the image data stored in the VRAM or an image corresponding to image data stored in another memory (the RAM 53, the storage unit 55, the memory card 61 connected to the memory I/F 59 or the like).

The bus 50 is also connected with a drive 63 via an interface not shown in the figure as required. A computer program read from a magnetic disk 64, an optical disk 65, a magneto-optical disk 66, a semiconductor memory 67 or the like mounted in the drive 63 is installed in the storage unit 55 or the like. Also, a computer program read from the memory card 61 mounted in the memory I/F 59 as required is installed in the storage unit 55 or the like as required.

The CPU 51 controls operations of the CDS circuit 32, the AGC circuit 33, and the A/D converter 34 on the basis of the instruction information from the user which information is input by the external operating input unit 54, the control information supplied from the image adjustment processing unit 41, information obtained by performing various programs, or the like.

Also, the CPU 51 controls operation of the CCD 31 by controlling a TG (Timing Generator) 71 for controlling driving of the CCD 31 and a V driver 72. Further, the CPU 51 controls an iris shutter driver 73 for controlling operation of the lens part 12 to adjust shutter speed and adjust the diaphragm mechanism.

Figure 4:
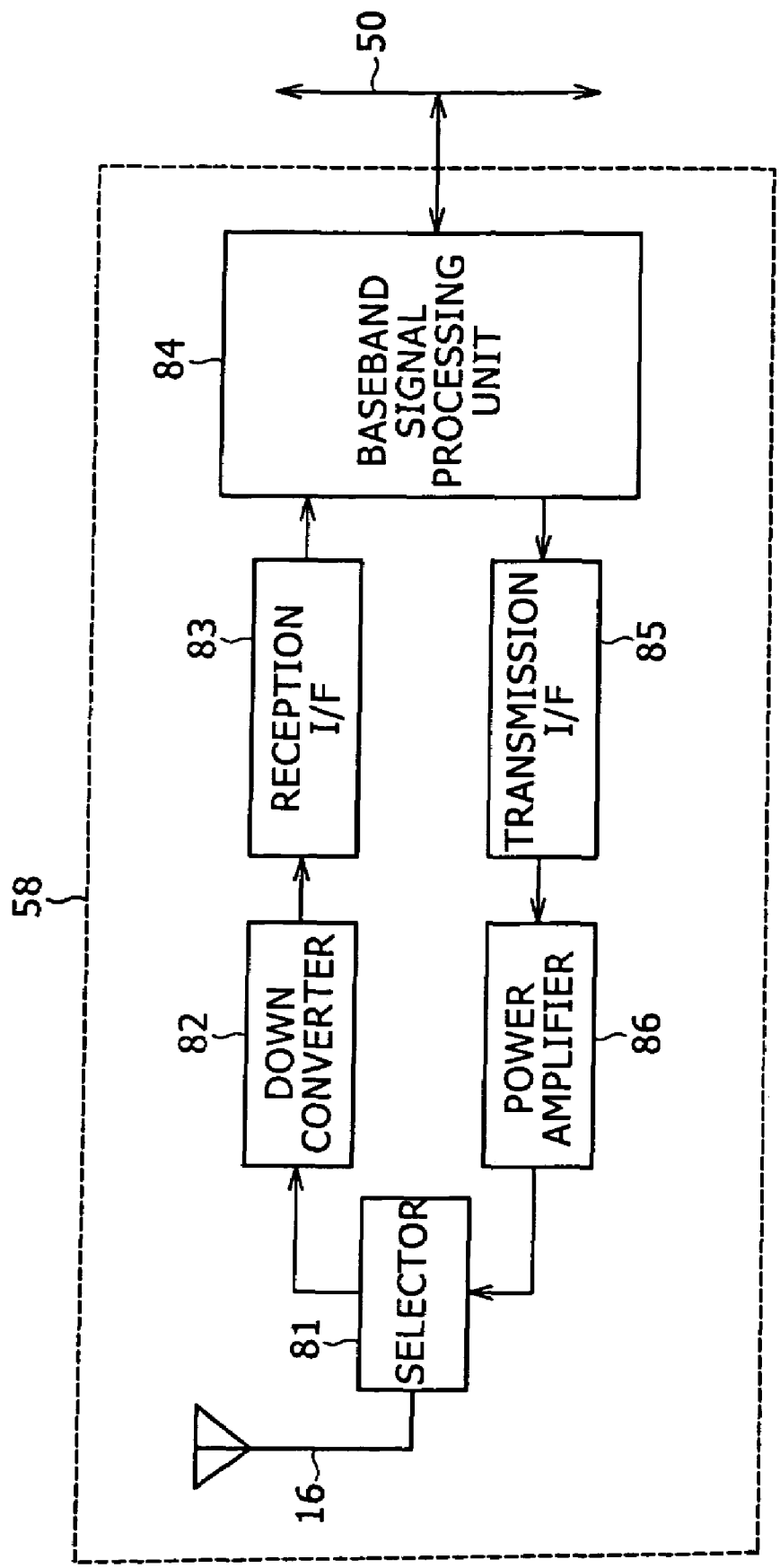
FIG. 4 is a block diagram showing a detailed example of the configuration of a radio communication unit in FIG. 3.

FIG. 4 is a diagram showing a detailed example of the configuration of the radio communication unit 58 in FIG. 3.

The antenna 16 receives a radio wave from another apparatus and supplies the received signal to a selector 81, and supplies a signal from the selector 81 to the other apparatus by a radio wave. The selector 81 demodulates the signal received from the antenna 16 by a CDMA (Code Division Multiple Access) system, for example, and then supplies a demodulated signal obtained as a result of the demodulation to a down converter 82.

The down converter 82 converts the frequency of a carrier of the obtained demodulated signal to a low frequency, and then supplies the demodulated signal to a reception I/F 83. The reception I/F 83 subjects the obtained demodulated signal to a process such as an A/D conversion process or the like, and then supplies the digital signal to a baseband signal processing unit 84.

The baseband signal processing unit 84 extracts received data from the digital signal obtained from the reception I/F 83 by performing packet processing, error signal processing and the like on the basis of a standard, and then supplies the received data to the bus 50. The radio communication unit 58 can thereby obtain a request to transfer image data which request is supplied from the server 5, and supply the request to the CPU 51 and the like.

Also, the baseband signal processing unit 84, for example, adds a control signal or the like to image data or the like obtained via the bus 50, and then supplies the result to a transmission I/F 85.

The transmission I/F 85 converts the obtained digital signal into an analog signal, and then supplies the analog signal to a power amplifier 86. A transmission signal whose power is increased by the power amplifier 86 is output from the antenna 16 via the selector 81. The radio communication unit 58 can thereby transfer thumbnail image data and compressed image data obtained via the bus 50 to the server 5.

Figure 5:
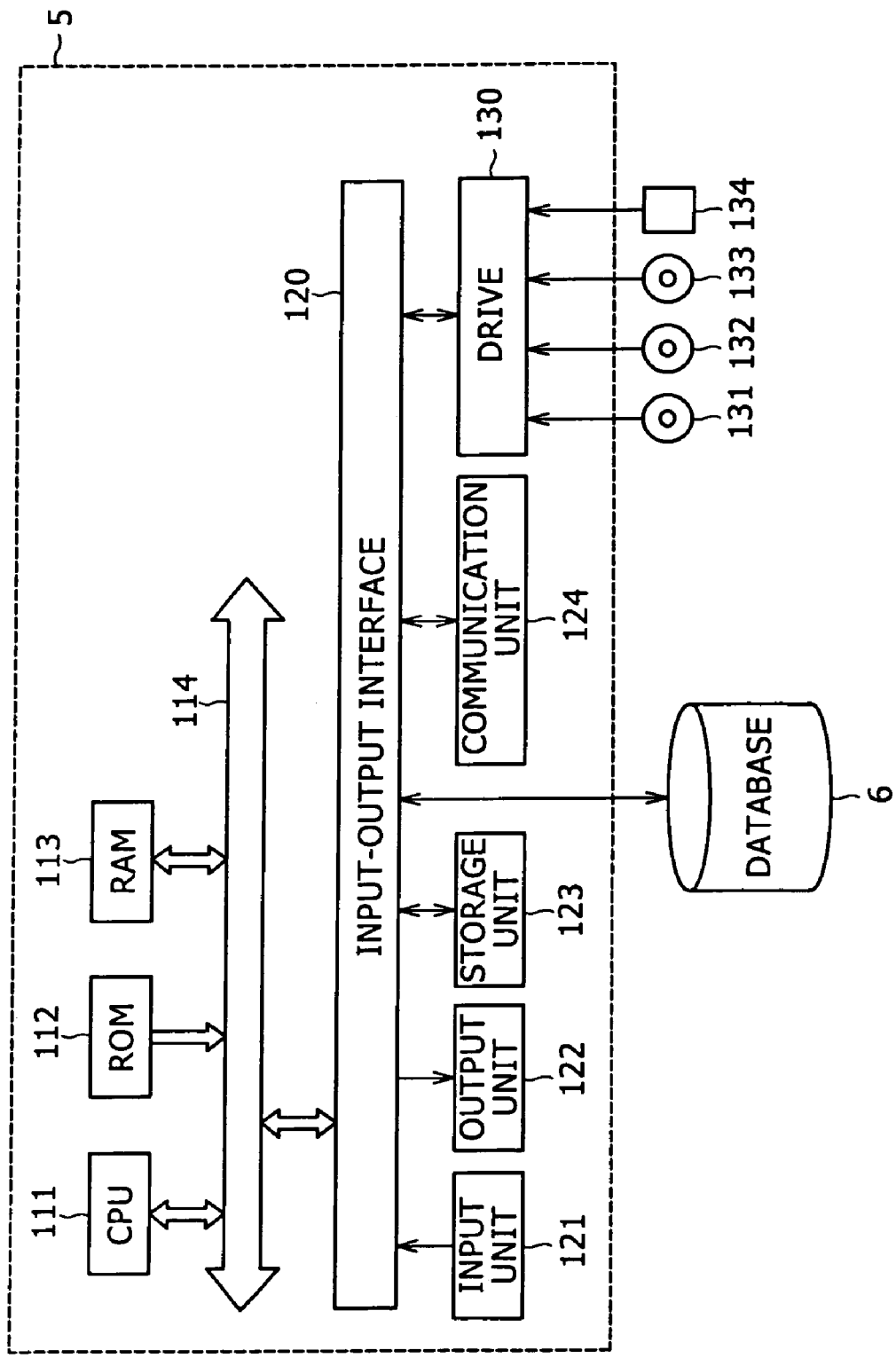
FIG. 5 is a block diagram showing an example of the internal configuration of a server in FIG. 1.

FIG. 5 is a diagram showing an example of the internal configuration of the server 5.

A CPU 111 in FIG. 5 performs various processes according to a program stored in a ROM 112 or a program loaded from a storage unit 123 into a RAM 113. The RAM 113 also stores, for example, data necessary for the CPU 111 to perform various processes as required.

The CPU 111, the ROM 112, and the RAM 113 are interconnected via a bus 114. The bus 114 is also connected with an input-output interface 120.

The input-output interface 120 is connected with: an input unit 121 including a keyboard, a mouse and the like; an output unit 122 including a display formed by a CRT (Cathode Ray Tube), an LCD (Liquid Crystal Display) or the like, a speaker and the like; a storage unit 123 formed by a hard disk or the like; and a communication unit 124 formed by a modem, a terminal adapter, a LAN adapter or the like.

The storage unit 123 is controlled by the CPU 111 to store thumbnail image data supplied from the digital camera 1 via the communication unit 124, and to supply the thumbnail image data stored in the storage unit 123 to the RAM 113, the output unit 122, the communication unit 124, the database 6 and the like as required.

The communication unit 124 is connected to the networks 3 and 7. The communication unit 124 is controlled by the CPU 111 to communicate with the digital camera 1 via the network 3 and to communicate with the personal computers 8 and 9 via the network 7.

In addition to communications using the modem, the terminal adapter or the like, the communication unit 124 has a function of performing communication processes using various standards such as, for example, USB (Universal Serial Bus), IEEE1394 (Institute of Electrical and Electronic Engineers), RS-232C (Recommended Standard 232 revision C), or SCSI (Small Computer System Interface).

The input-output interface 120 is also connected with the database 6 in FIG. 1, in which image data and thumbnail image data obtained from the digital camera 1 are stored in association with each other.

When necessary, the input-output interface 120 is also connected with a drive 130, into which a magnetic disk 131, an optical disk 132, a magneto-optical disk 133, a semiconductor memory 134 or the like is inserted as required. A computer program read therefrom is installed in the storage unit 123 as required.

When the CPU 111 obtains thumbnail image data supplied from the digital camera 1 via the network 3 by controlling the communication unit 124, the CPU 111 supplies the thumbnail image data to the RAM 113, the storage unit 123 or the like to store the thumbnail image data therein, supplies the thumbnail image data to the output unit 122 to display corresponding thumbnail images on the display or the like, and supplies the thumbnail image data to the personal computer 8 or 9 via the communication unit 124.

Then, the CPU 111 controls the input unit 121 to receive an instruction from the user referring to the displayed thumbnail images, and then supplies a request to transfer image data corresponding to the specified thumbnail image to the digital camera 1 via the communication unit 124 on the basis of the instruction input from the user. Also, the CPU 111 controls the communication unit 124 to supply a request to transfer image data, which request is obtained from the personal computers 8 and 9 via the communication unit 124, to the digital camera 1 via the network 3.

When obtaining image data preferentially transferred via the communication unit 124 on the basis of the request, the CPU 111 supplies the obtained image data to the database 6 so as to store the image data in the database 6 in association with the thumbnail image data stored in the RAM 113 or the storage unit 123, and displays the information on the display or the like of the output unit 122. Incidentally, when the request to transfer the image data is supplied from the personal computer 8 or 9, the CPU 111 controls the communication unit 124 to supply the information to the personal computer as the source of the request. Incidentally, the stored image data is usable to the server 5 and the personal computers 8 and 9.

In addition to the storing of the data obtained from the digital camera 1 in the database 6, a corresponding image may be displayed on the display of the output unit 122. When the source of the request is the personal computer 8 or 9, the image data may be supplied to the personal computer as the source of the request.

Figure 6:
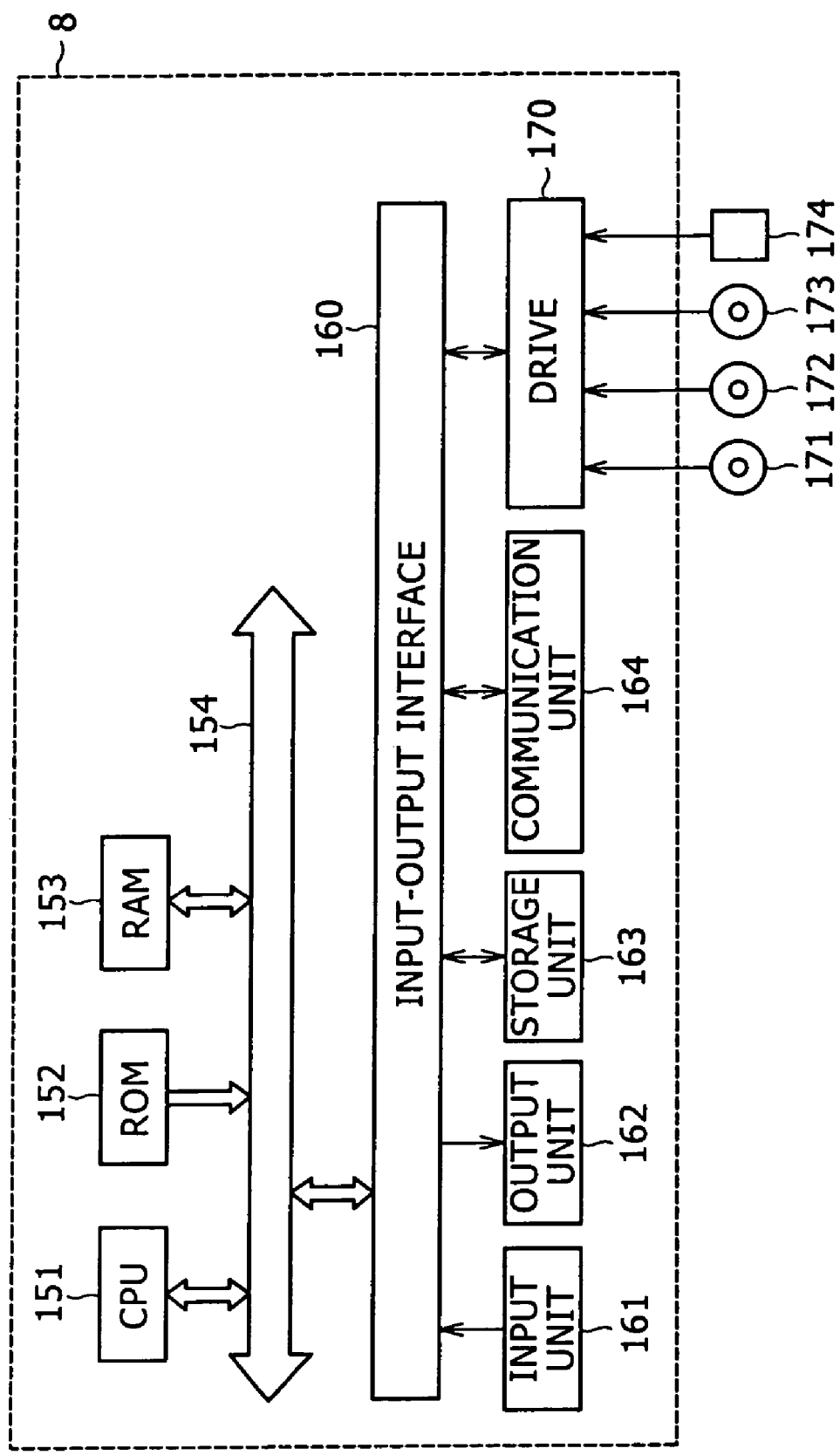
FIG. 6 is a block diagram showing an example of the internal configuration of a personal computer in FIG. 1.

FIG. 6 is a diagram showing an example of the internal configuration of the personal computer 8.

A CPU 151 in FIG. 6 performs various processes according to a program stored in a ROM 152 or a program loaded from a storage unit 163 into a RAM 153. The RAM 153 also stores, for example, data necessary for the CPU 151 to perform various processes as required.

The CPU 151, the ROM 152, and the RAM 153 are interconnected via a bus 154. The bus 154 is also connected with an input-output interface 160.

The input-output interface 160 is connected with: an input unit 161 including a keyboard, a mouse and the like; an output unit 162 including a display formed by a CRT (Cathode Ray Tube), an LCD (Liquid Crystal Display) or the like, a speaker and the like; a storage unit 163 formed by a hard disk or the like; and a communication unit 164 formed by a modem, a terminal adapter, a LAN adapter or the like.

The storage unit 163 is controlled by the CPU 151 to store thumbnail image data supplied from the server 5 via the communication unit 164, and to supply the thumbnail image data stored in the storage unit 163 to the RAM 153, the output unit 162 and the like as required.

The communication unit 164 is connected to the network 7. The communication unit 164 is controlled by the CPU 151 to communicate with the server 5 via the network 7.

In addition to communications using the modem, the terminal adapter or the like, the communication unit 164 has a function of performing communication processes using various standards such as, for example, USB (Universal Serial Bus), IEEE1394 (Institute of Electrical and Electronic Engineers), RS-232C (Recommended Standard 232 revision C), or SCSI (Small Computer System Interface).

When necessary, the input-output interface 160 is also connected with a drive 170, into which a magnetic disk 171, an optical disk 172, a magneto-optical disk 173, a semiconductor memory 174 or the like is inserted as required. A computer program read therefrom is installed in the storage unit 163 as required.

When the CPU 151 obtains thumbnail image data and image data supplied from the server 5 via the network 7 by controlling the communication unit 164, the CPU 151 supplies the obtained data to the RAM 153, the storage unit 163 or the like to store the data therein, and supplies the data to the output unit 162 to display corresponding thumbnail images on the display or the like.

Also, the CPU 151 controls the input unit 161 to receive an instruction from the user referring to the displayed thumbnail images, and then supplies a request to transfer image data corresponding to the specified thumbnail image to the server 5 via the communication unit 164 on the basis of the instruction input from the user. The server 5 supplies this request to the digital camera 1 via the network 3.

When image data preferentially requested on the basis of the request is transferred to the server 5, the information is supplied from the server 5. When the CPU 151 obtains the information via the communication unit 164, the CPU 151 supplies the information to the output unit 162 to display the information on the display or the like.

Incidentally, since the configuration of the personal computer 9 in FIG. 1 and the operation of each part of the personal computer 9 are similar to the configuration of the personal computer 8 and the operation of each part of the personal computer 8 as described with reference to FIG. 6, the block diagram of FIG. 6 is applied also as an example of the configuration of the personal computer 9, and a description thereof will be omitted.

An image transfer process by the digital camera 1 will next be described with reference to a flowchart of FIG. 7.

When a user operates the power supply switch 13 to bring the power supply into an on state, the CPU 51 of the digital camera 1 performs initialization in step S1, and thereby initializes each part, checks operation, and performs a preparation process, for example. Also, the CPU 51 controls the radio communication unit 58 to establish a radio communication with the base station 2 and be thereby connected to the network 3.

After the initialization process is completed, the CPU 51 determines in step S2 whether there is thumbnail image data yet to be transmitted which data is retained in the RAM 53, the storage unit 55 or the like. When the CPU 51 determines that there is thumbnail image data yet to be transmitted, the CPU 51 advances the process to step S3 to perform a thumbnail image data transmission process. Details of the thumbnail image data transmission process will be described later with reference to a flowchart of FIG. 9. When the process of step S3 is completed, the CPU 51 returns the process to step S2 to repeat the process from step S2 on down.

When the CPU 51 determines in step S2 that there is no thumbnail image data yet to be transmitted, the CPU 51 advances the process to step S4 to determine whether there is image data yet to be transmitted. When the CPU 51 determines that there is image data yet to be transmitted, the CPU 51 advances the process to step S5 to perform an image data transmission process. Details of the image data transmission process will be described later with reference to a flowchart of FIG. 10. When the process of step S5 is completed, the CPU 51 returns the process to step S2 to repeat the process from step S2 on down.

When the CPU 51 determines in step S4 that there is no image data yet to be transmitted, the CPU 51 advances the process to step S6 to determine whether an instruction to perform an image pickup process is given by the user by controlling the external operating input unit 54. When the CPU 51 determines that a photographing mode is selected by the user operating the mode setting knob 15, for example, and that an instruction to perform the image pickup process is given, the CPU 51 performs the image pickup process in step S7. Details of the image pickup process will be described later with reference to a flowchart of FIG. 8. When the image pickup process is completed, the CPU 51 advances the process to step S8.

When the CPU 51 determines in step S6 that an instruction to perform the image pickup process is not given, the CPU 51 omits the process of step S7, and advances the process to step S8.

The CPU 51 determines in step S8 whether to end the image transfer process. When the CPU 51 determines that the image transfer process is not to be ended, the CPU 51 returns the process to step S2 to repeat the process from step S2 on down.

When the CPU 51 determines that the image transfer process is to be ended, the CPU 51 performs an ending process in step S9, and thereby ends the image transfer process.

Details of the image pickup process performed in step S7 in FIG. 7 will next be described with reference to a flowchart of FIG. 8.

First, in step S21, the CPU 51 prepares for image pickup by controlling each part. In step S22, the CPU 51 determines whether or not an instruction for image pickup is given. The CPU 51 stands by until the CPU 51 determines that an instruction for image pickup is given.

When the CPU 51 controls the external operating input unit 54 and determines that an instruction for image pickup is given by the user operating the shutter button 14, for example, the CPU 51 picks up an image of a subject in step S23. The CPU 51 stores image data obtained by the image pickup in the storage unit 55 or the like in step S24. The CPU 51 generates thumbnail image data in step S25. The CPU 51 then stores the thumbnail image data in the RAM 53, the storage unit 55 or the like.

Figure 7:
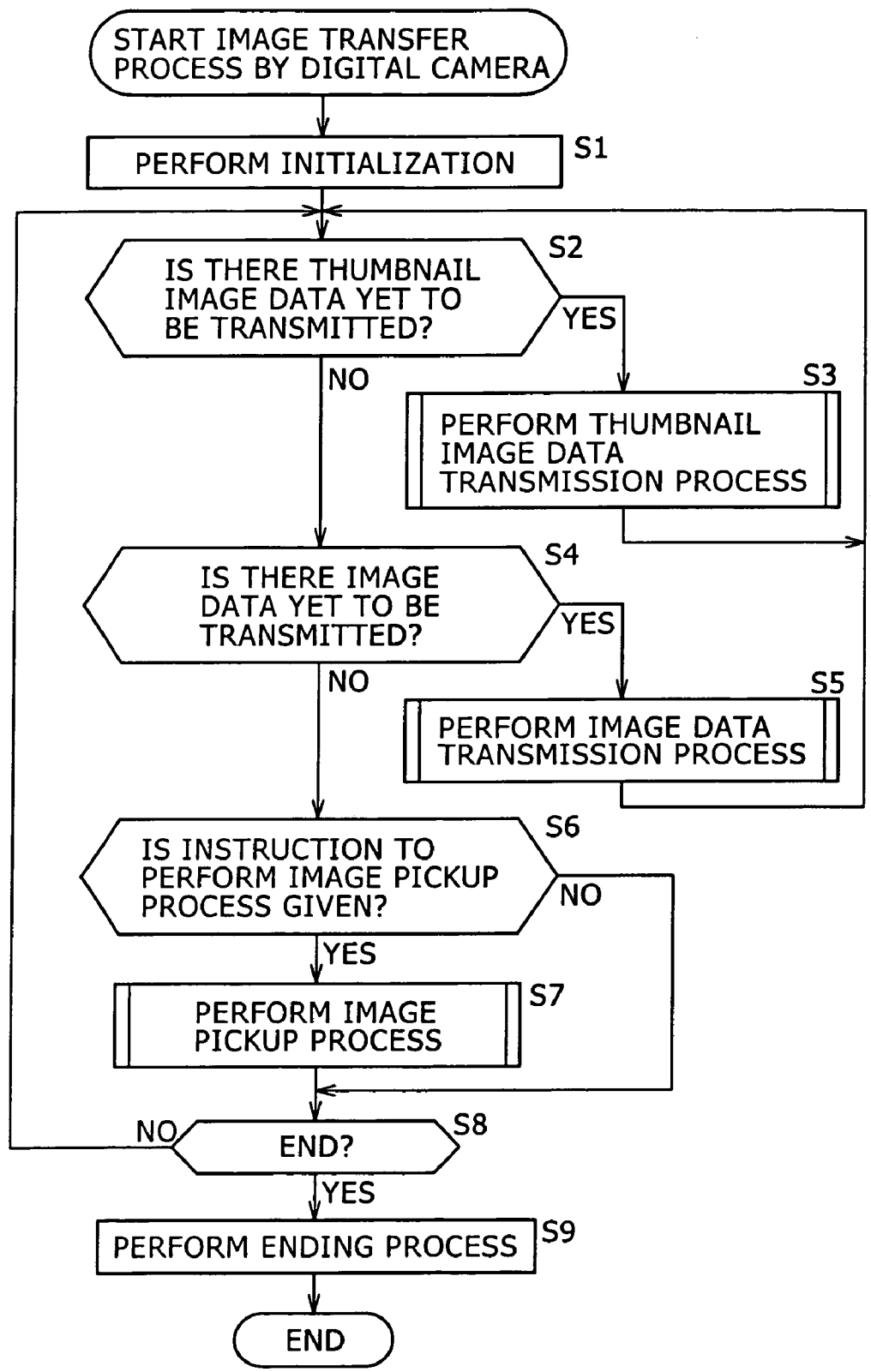
FIG. 7 is a flowchart of assistance in explaining an image transfer process by the digital camera.
Figure 8:
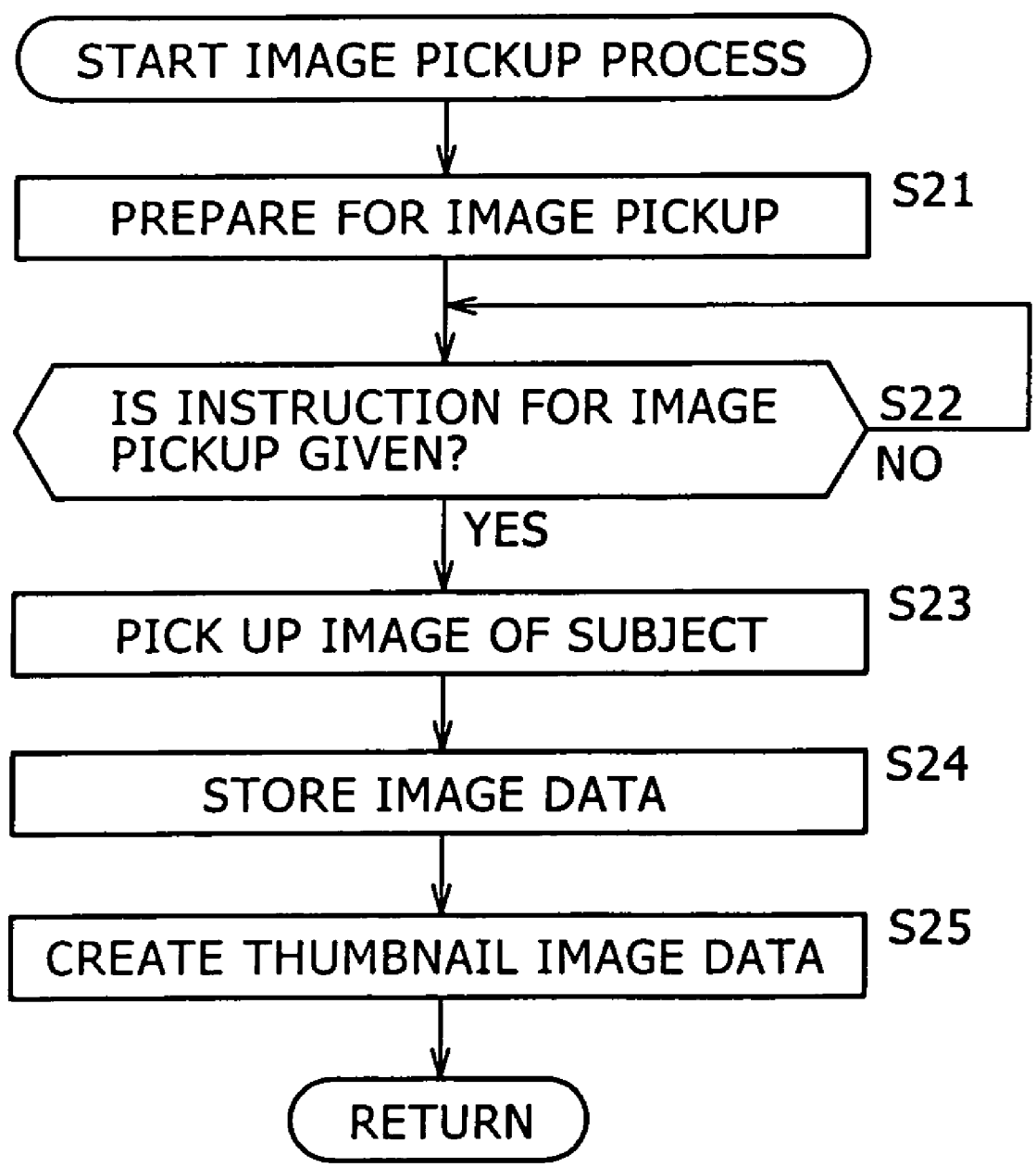
FIG. 8 is a flowchart of assistance in explaining details of an image pickup process performed in step S7 in FIG. 7.

When the process of step S25 is completed, the CPU 51 ends the image pickup process and returns the process to step S8 in FIG. 7.

Figure 9:
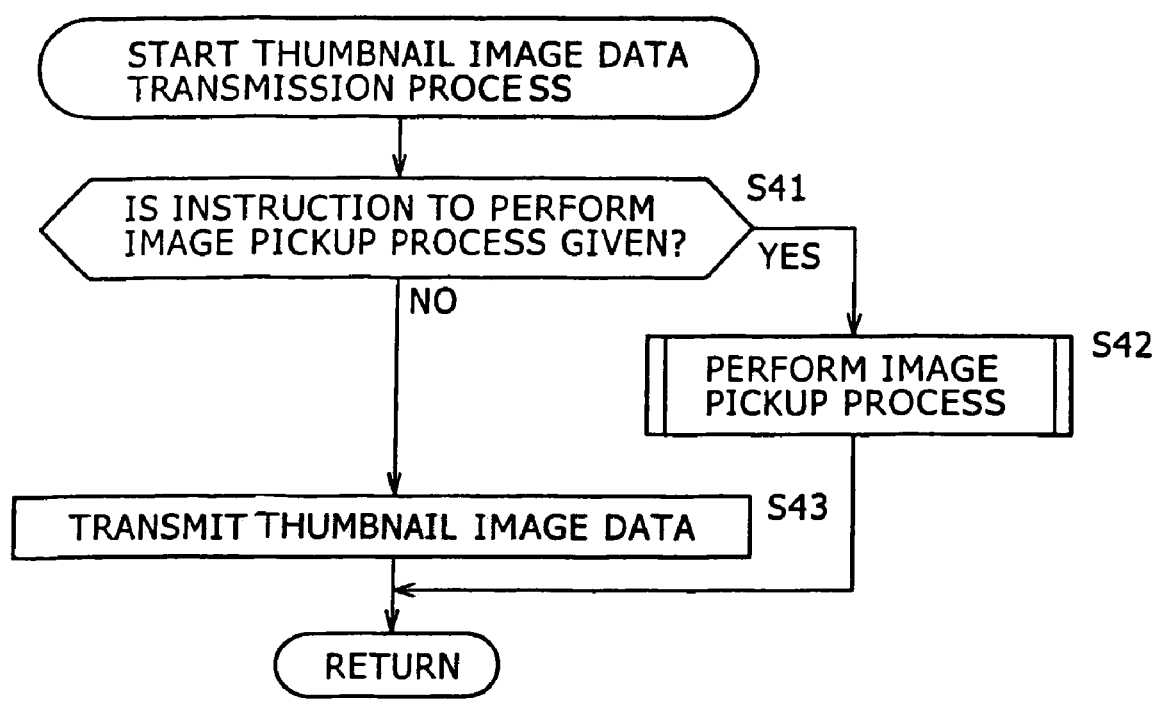
FIG. 9 is a flowchart of assistance in explaining details of a thumbnail image data transmission process performed in step S3 in FIG. 7.

Details of the thumbnail image data transmission process performed in step S3 in FIG. 7 will next be described with reference to a flowchart of FIG. 9.

First, in step S41, the CPU 51 determines whether or not an instruction to perform an image pickup process is given. When the CPU 51 determines that the instruction is given, the CPU 51 advances the process to step S42 to perform the same image pickup process as described with reference to the flowchart of FIG. 8. Then, when the image pickup process is completed, the CPU 51 ends the thumbnail image data transmission process and returns the process to step S2 in FIG. 7.

When the CPU 51 determines in step S41 that the instruction to perform the image pickup process is not given, the CPU 51 transmits the thumbnail image data to the server 5 via the radio communication unit 58 in step S43. Then, the CPU 51 ends the image data transmission process and returns the process to step S2 in FIG. 7.

Figure 10:
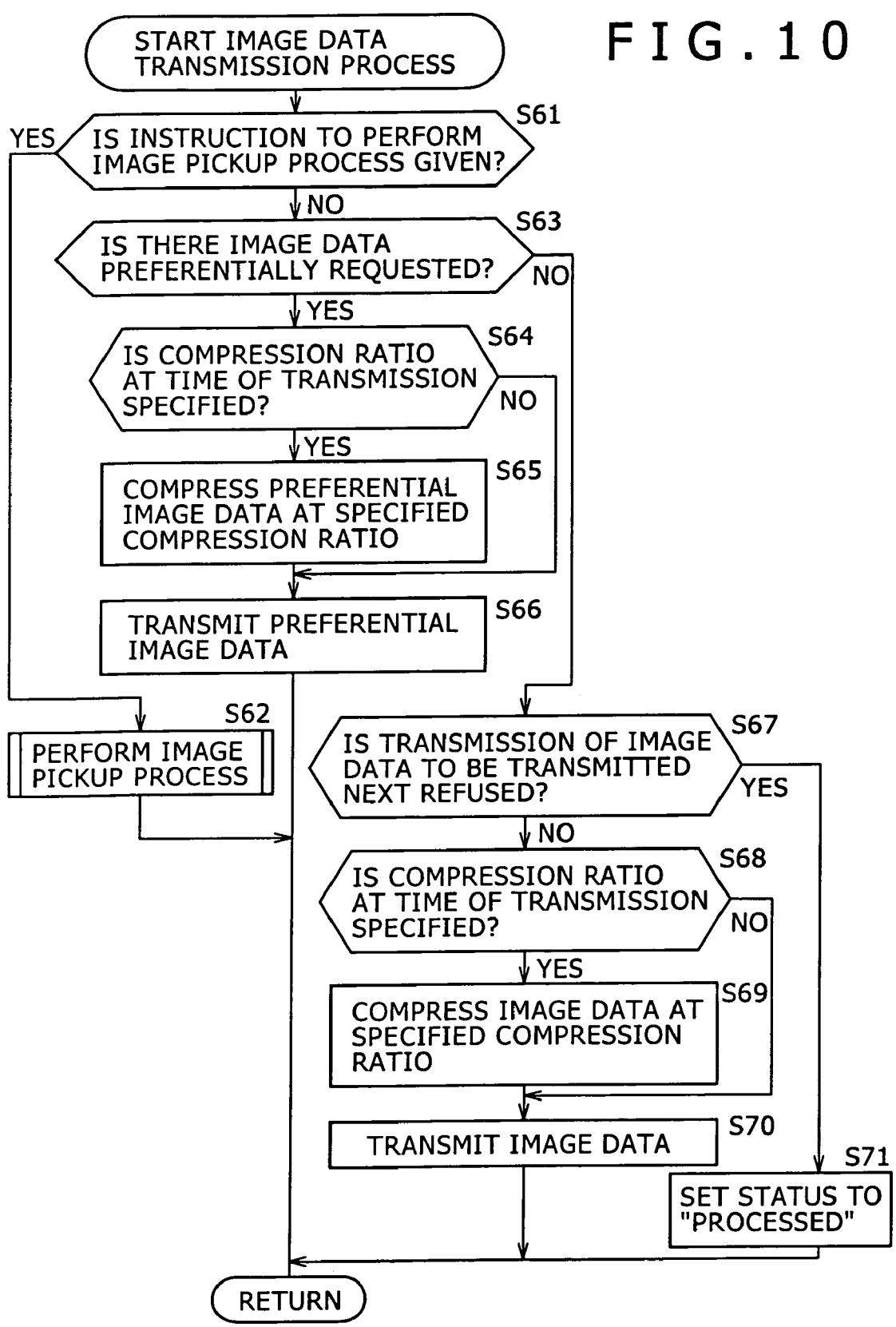
FIG. 10 is a flowchart of assistance in explaining an image data transmission process performed in step S5 in FIG. 7.

The image data transmission process performed in step S5 in FIG. 7 will next be described with reference to a flowchart of FIG. 10.

First, in step S61, the CPU 51 determines whether an instruction to perform the image pickup process is given. When the CPU 51 determines that the instruction is given, the CPU 51 performs the same image pickup process as described with reference to the flowchart of FIG. 8 in step S62. When the image pickup process is completed, the CPU 51 ends the image data transmission process and returns the process to step S2 in FIG. 7.

When the CPU 51 determines in step S61 that the instruction to perform the image pickup process is not given, the CPU 51 advances the process to step S63 to determine whether there is image data preferentially requested.

When the CPU 51 obtains a preferential request supplied from the server 5 via the radio communication unit 58 by a request reception process to be described later with reference to a flowchart of FIG. 11, and determines that the image data is not transmitted yet, the CPU 51 advances the process to step S64 to determine whether or not a compression ratio at the time of transmission is specified by the preferential request.

When the CPU 51 determines that a compression ratio at the time of transmission is specified, the CPU 51 advances the process to step S65, where the CPU 51 supplies preferential image data, which is the requested image data and is stored in the storage unit 55 or the like, to the DSP 35 to compress the preferential image data at the specified compression ratio. Incidentally, when the preferential image data is stored in the storage unit 55 or the like in a compressed state, the compression ratio is changed to the specified value. After compressing the preferential image data at the specified compression ratio, the CPU 51 advances the process to step S66.

When the CPU 51 determines in step S64 that a compression ratio at the time of transmission is not specified, the CPU 51 omits the process of step S65, and advances the process to step S66.

In step S66, the CPU 51 controls the radio communication unit 58 to transmit the specified preferential image data to the server 5 via the network. The CPU 51 sets a status of the image data to "processed". Thereafter the CPU 51 ends the image data transmission process, and returns the process to step S2 in FIG. 7.

When the CPU 51 determines in step S63 that there is no preferentially requested image data that is yet to be transmitted, the CPU 51 advances the process to step S67 to determine whether or not transmission of image data to be transmitted next is refused by a request from the server 5.

When the CPU 51 determines that the transmission is not refused, the CPU 51 advances the process to step S68 to determine whether or not a compression ratio at the time of transmission is specified. When the CPU 51 determines that a compression ratio at the time of transmission is specified, the CPU 51 in step S69 controls the DSP 35 to compress the image data to be transmitted at the specified compression ratio as in the process of step S65. The CPU 51 then advances the process to step S70.

When the CPU 51 determines in step S68 that a compression ratio at the time of transmission is not specified, the CPU 51 omits the process of step S69, and advances the process to step S70.

In step S70, the CPU 51 transmits the image data to the server 5 via the radio communication unit 58. The CPU 51 sets a status of the image data to "processed." Then, the CPU 51 ends the image data transmission process, and returns the process to step S2 in FIG. 7.

When the CPU 51 determines in step S67 that the transmission of the image data to be transmitted next is refused by the server 5, the CPU 51 sets a status of the image data to "processed" in step S71. Then the CPU 51 ends the image data transmission process.

As described above, the CPU 51 of the digital camera 1 controls each part to transmit thumbnail image data to the server 5 preferentially before image data during intervals between image pickup processes.

A process of receiving a request supplied from the server 5 which process is performed by the digital camera 1 will next be described with reference to a flowchart of FIG. 11.

First, in step S91, the CPU 51 controls the radio communication unit 58 to determine whether or not a request is received from the server. The CPU 51 stands by until the CPU 51 determines that a request is received. When the CPU 51 determines that a request is received, the CPU 51 obtains the request, and determines whether or not corresponding image data is yet to be transmitted.

The CPU 51 controls each part such as the storage unit 55 or the like where image data is stored to refer to a status of the corresponding image data. When the referred-to status indicates "untransmitted" and thus the CPU 51 determines that the corresponding image data is yet to be transmitted, the CPU 51 retains the request in association with the image data in the RAM 53 or the like in step S93. This request is referred to in, for example, steps S63, S64, S67, and S68 in the image data transmission process of FIG. 10. When the process of step S93 is completed, the CPU 51 advances the process to step S94.

When the CPU 51 determines in step S92 that the corresponding image data has already been transmitted, the CPU 51 omits the process of FIG. 93, and advances the process to step S94.

The CPU 51 in step S94 determines whether or not to end the request reception process. When the CPU 51 determines that the request reception process is not to be ended, the CPU 51 returns the process to step S91 to repeat the process from step S91 on down. When the CPU 51 determines that the request reception process is to be ended, the CPU 51 performs an ending process in step S95, and thereby ends the request reception process.

As described above, the CPU 51 of the digital camera 1 receives a request from the server 5, and controls the transfer of image data on the basis of the request.

An image data reception process by the server 5 will next be described with reference to a flowchart of FIG. 12.

In step S111, the CPU 111 of the server 5 controls the communication unit 124 to determine whether or not thumbnail image data transmitted from the digital camera 1 is received. When the CPU 111 determines that the thumbnail image data is received, the CPU 111 displays thumbnail images corresponding to the received thumbnail image data on the display or the like in step S112. Then the CPU 111 advances the process to step S113.

When the CPU 111 determines in step S111 that no thumbnail image data is received, the CPU 111 omits the process of step S112, and advances the process to step S113.

In step S113, the CPU 111 controls the communication unit 124 to determine whether or not image data transmitted from the digital camera 1 is received. When the CPU 111 determines that image data transmitted from the digital camera 1 is received, the CPU 111 stores the received image data in the database 6 in association with corresponding thumbnail image data in step S114. Also, as described later, the CPU 111 controls the input unit 121 to display a mark indicating that the corresponding image data is received on a GUI displaying the thumbnail image. When the process of step S114 is completed, the CPU 111 advances the process to step S115.

When the CPU 111 determines in step S113 that no image data is received, the CPU 111 omits the process of step S114, and advances the process to step S115.

In step S115, the CPU 111 controls the input unit 121 to determine whether a request for the transfer of image data is input by the user. Also, the CPU 111 controls the communication unit 124 to determine whether a request for the transfer of image data is supplied from the personal computer 8 or 9.

When the CPU 111 determines that a request for the transfer of image data is input by the user of the server 5 or that a request for the transfer of image data is supplied from the personal computer 8 or 9, the CPU 111 in step S116 controls the communication unit 124 to supply the request to the digital camera 1. After supplying the request, the CPU 111 advances the process to step S117.

When the CPU 111 determines in step S115 that the request for the transfer of image data is not input by the user or that the request for the transfer of image data is not supplied from the personal computer 8 or 9, the CPU 111 omits the process of step S116, and advances the process to step S117.

The CPU 111 determines in step S117 whether to end the image data reception process. When the CPU 111 determines that the image data reception process is not to be ended, the CPU 111 returns the process to step S111 to repeat the process from step S111 on down.

When the CPU 111 determines that the image data reception process is to be ended, the CPU 111 performs an ending process in step S118, and thereby ends the image data reception process.

As described above, the CPU 111 of the server 5 receives thumbnail image data and image data supplied from the digital camera 1, and transmits a request for the transfer of image data to the digital camera 1.

Figure 13A:
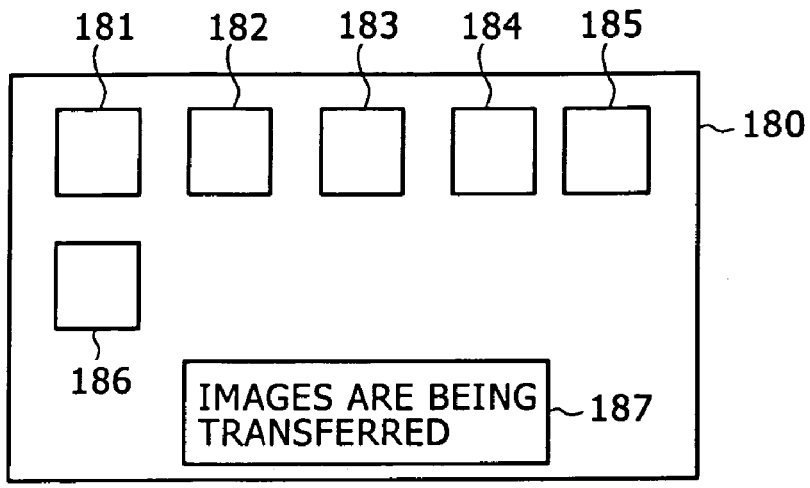
FIG. 13A is a schematic diagram showing an example of a GUI screen displayed on a display of the server.
Figure 13B:
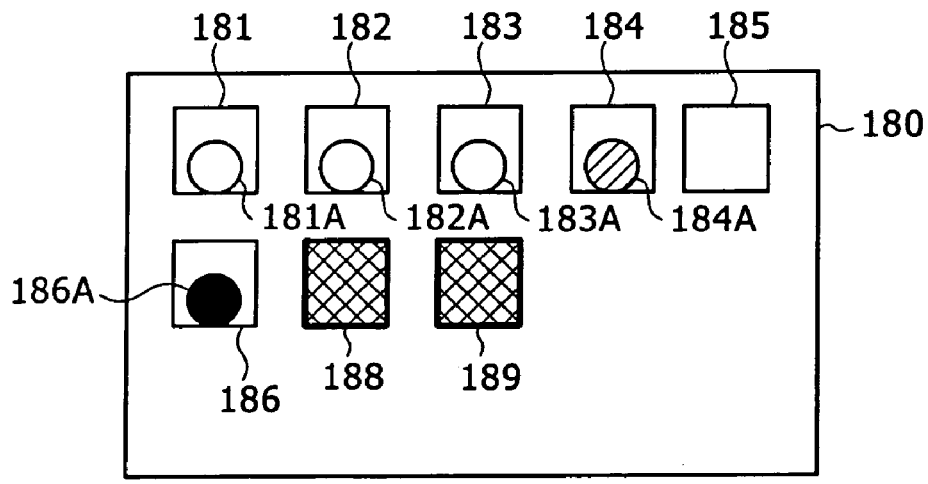
FIG. 13B is a schematic diagram showing the example of the GUI screen displayed on the display of the server.

FIG. 13A and FIG. 13B are schematic diagrams showing examples of a GUI screen displayed on the display of the server 5.

When thumbnail image data is transferred first before image data, a screen 180 as shown in FIG. 13A is displayed on the display of the server 5. The screen 180 displays thumbnail images 181 to 186 corresponding to the transferred thumbnail image data. Also, the screen 180 displays an indication 187 of "IMAGES ARE BEING TRANSFERRED" indicating that thumbnail image data is being transferred.

When image data corresponding to the displayed thumbnail images is transferred, the screen 180 displays marks 181A to 183A indicating that the image data is transferred on the corresponding thumbnail images 181 to 183, respectively, as shown in FIG. 13B.

A mark 184A indicating that image data is being transferred is displayed on the thumbnail image 184 for which the image data is being transferred.

When image data corresponding to the thumbnail image 186 is not necessary, the user operates the input unit 121 to select the thumbnail image 186 and input an instruction indicating that the transfer of the image data corresponding to the thumbnail image 186 is not necessary. In this case, a request refusing the transfer of the image data is supplied to the digital camera 1, and a mark 186A indicating that the transfer is unnecessary is displayed on the thumbnail image 186 on the screen 180.

Further, when a new image pickup process is performed by the digital camera 1, new thumbnail image data is transferred to the server 5. Then, thumbnail images 188 and 189 corresponding to the newly received thumbnail image data are displayed as newly arrived thumbnails on the screen 180. These thumbnail images 188 and 189 may be highlighted for a predetermined time, or may be displayed in the same manner as the other thumbnail images 181 to 186.

Incidentally, the above-described screen 180 is not only displayed on the display of the server 5 but also displayed similarly on the personal computer 8 or 9 that has accessed the server 5 and is in a state for obtaining thumbnail image data.

The digital camera 1 and the server 5 operating as described above enable the user on the server 5 side to refer to thumbnail images before completion of the transfer of image data, and to have necessary image data transferred preferentially. Therefore, the user can work efficiently.

Figure 14A:
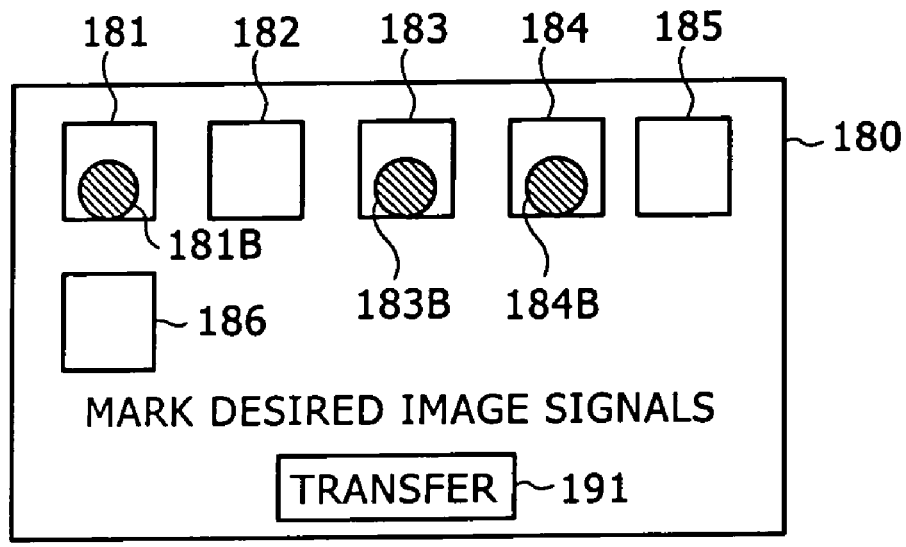
FIG. 14A is a schematic diagram showing another example of the GUI screen displayed on the display of the server.
Figure 14B:
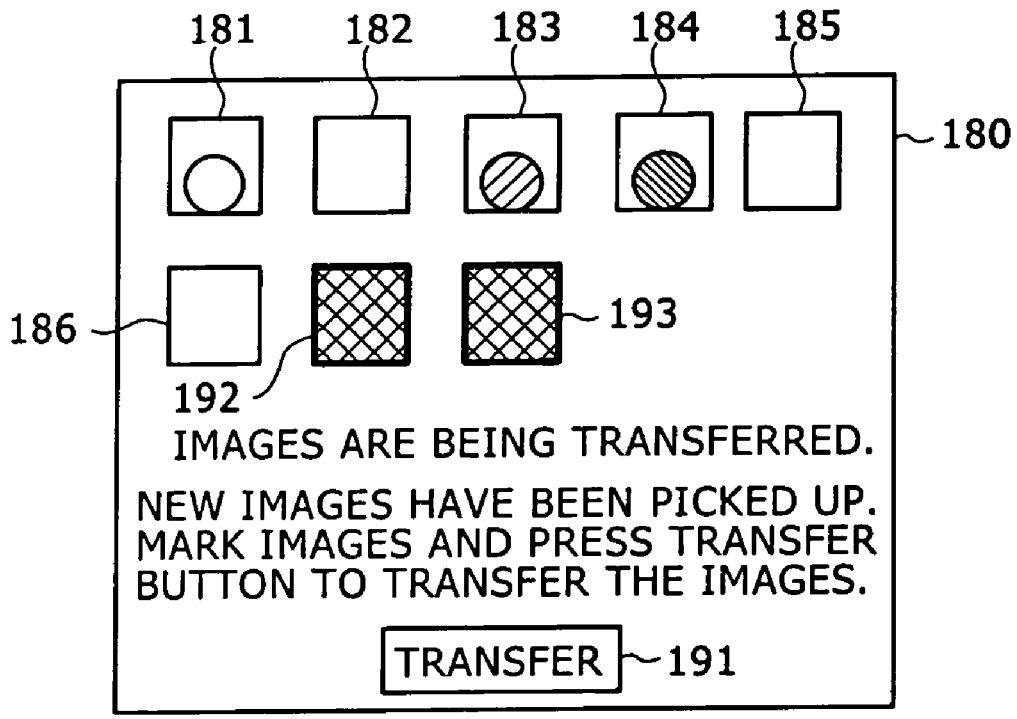
FIG. 14B is a schematic diagram showing the other example of the GUI screen displayed on the display of the server.

FIG. 14A and FIG. 14B are diagrams showing examples of a screen displayed on the server 5 in a case where only image data selected by the user of the server 5 is transferred.

When the user of the server 5 selects only necessary images from thumbnail images displayed on the screen 180, transfer reservation marks 181B, 183B, and 184B are displayed on the selected thumbnail images 181, 183, and 184, respectively, as shown in FIG. 14A. The user operates a transfer button 191 to request the transfer of image data corresponding to these thumbnail images.

When the digital camera 1 starts the transfer of the requested image data in response to the request, various marks indicating states related to the transfer of the image data are displayed on the thumbnail images 181, 183, and 184 on the screen 180, as shown in FIG. 14B.

When the digital camera 1 performs a new image pickup process and transfers thumbnail image data to the server 5, thumbnail images 192 and 193 corresponding to the transferred thumbnail image data are displayed on the screen 180.

While the transfer of still image data has been described above, the present invention is not limited to this. The transferred data may be moving image data, which is transferred by the same process as described above.

When moving image data is transferred, corresponding thumbnail images are formed by representative images extracted from a moving image at predetermined time intervals of, for example, four minutes. Specifically, in this case, five pieces of thumbnail image data are extracted from moving image data for 20 minutes, for example, and are transferred to the server 5 preferentially before the moving image data.

Incidentally, a method of extracting thumbnail images is not limited to the method of extracting thumbnail images at time intervals, and may be any method. For example, when the digital camera 1 calculates a difference between images temporally adjacent to each other and a difference signal exceeds a threshold value, it is determined that a scene change occurs, and thus a thumbnail image may be extracted for each scene. When moving image data is MPEG (Moving Picture Expert Group) data, an I-picture may be extracted as a thumbnail image.

Thumbnail images extracted from one piece of moving image data as described above are displayed on a screen 200 as shown in FIG. 15A on the server 5. The screen 200 displays: thumbnail images 201-1 to 201-5 extracted from a first moving image file 201; thumbnail images 202-1 to 202-5 extracted from a second moving image file 202; and a transfer button 203 operated by the user to transfer a selected moving image file.

When the user selects a moving image file and then operates the transfer button 203, the request information is supplied to the digital camera 1, and transfer of the moving image file is started. At this time, the screen 200 is displayed as shown in FIG. 15B. In FIG. 15B, an anchor 204 is displayed at the first moving image file 201 selected by the user, and marks 201-1A to 201-3A indicating that transfer is completed are displayed in the thumbnail images 201-1 to 201-3, respectively, corresponding to parts of the first moving image file 201 which parts have been transferred.

Then, when the digital camera 1 performs a new image pickup process and generates a new moving image file, thumbnail image data of the moving image file is supplied to the server 5, and pieces 205-1 to 205-5 of the thumbnail image data of the third moving image file 205 are displayed on the screen 200 as shown in FIG. 16.

As described above, thumbnail moving image data can be transferred preferentially even in the case of transferring moving image data.

While the above description has been made of the preferential transfer of thumbnail image data before image data, the preferential transfer is not limited to thumbnail image data, and information on image data may be transmitted simultaneously with thumbnail image data.

Figure 17A:
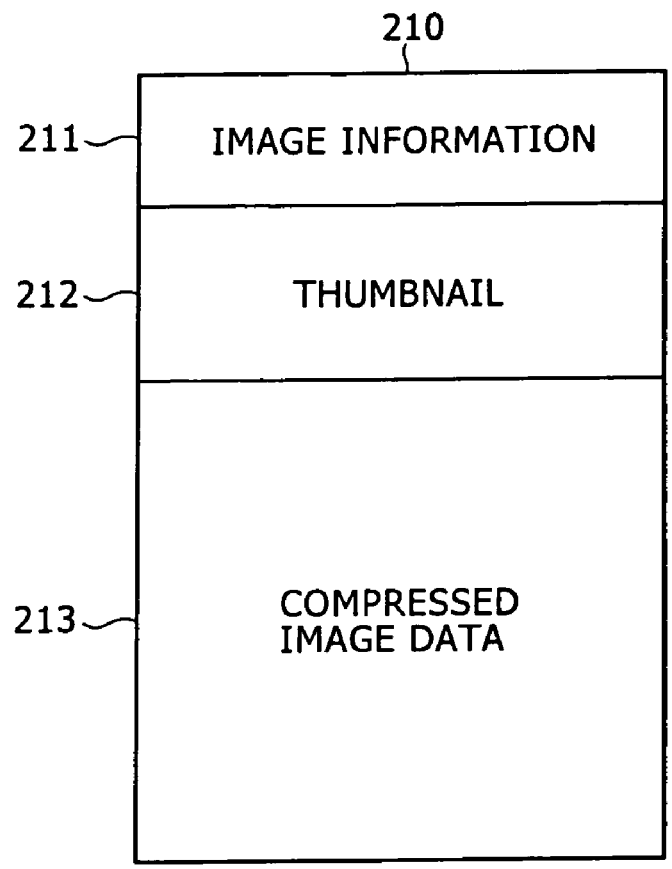
FIG. 17A is a schematic diagram showing an example of a format of JPEG image data.
Figure 17B:
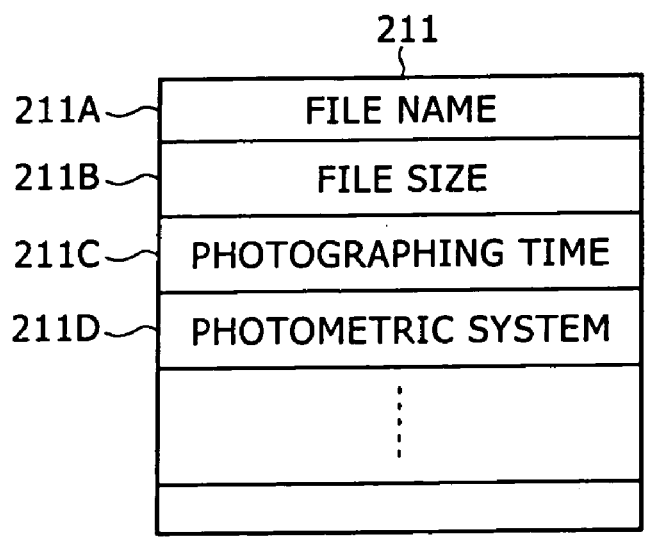
FIG. 17B is a schematic diagram showing the example of the format of JPEG image data.

FIG. 17A and FIG. 17B are diagrams showing an example of a format of JPEG image data.

As shown in FIG. 17A, image information 211 as information on image data and thumbnail image data 212 corresponding to the image data are included in a header part of the JPEG image data 210, and compressed image data 213 as image data that has been compressed is stored in a data part of the JPEG image data 210.

As shown in FIG. 17B, the image information 211 includes various information on the compressed image data 213, such as a file name 211A, a file size 211B, a photographing time 211C, a photometric system 211D and the like.

The digital camera 1 transfers the thumbnail image data to which this image information is added, whereby the server 5 can display the information on the image data before the transfer of the image data is completed. In this case, a screen 220 as shown in FIG. 18 is displayed on the display of the server 5.

The screen 220 shown in FIG. 18 displays pieces of image information 221A to 224A under thumbnail images 221 to 224, respectively. Thus, referring to this information together with the thumbnail images 221 to 224, the user can select necessary image data.

Incidentally, image data to be transferred may be transferred after being encrypted by a predetermined protocol typified by SSL (Secure Sockets Layer) and IPsec (IP Security), for example.

The server 5 may authenticate the digital camera 1 transferring image data by using an ID and a password distributed in advance. In this case, the digital camera 1 supplies the ID and the password in the initialization process at step S1 in FIG. 7, and then establishes connection.

FIG. 19 is a timing chart of assistance in explaining a process flow in a case of transfer of image data encrypted by a first encryption system in the image processing system of FIG. 1.

First, in step S131, the digital camera 1 supplies the ID and the password distributed in advance to the server 5 via the network 3. When obtaining the ID and the password in step S151, the server 5 in step S152 authenticates the digital camera 1 by using the ID and the password obtained.

When the authentication process is completed, the server 5 supplies a result of the authentication to the digital camera 1 in step S153. The digital camera 1 obtains the result of the authentication in step S132. When the digital camera 1 is authenticated, a connection between the digital camera 1 and the server 5 is established by these processes.

Having established the connection, the digital camera 1 requests a public key provided by the server 5 from the server 5 in step S133. Incidentally, as to the public key request, a plurality of public keys corresponding in number to that of pieces of image data to be transmitted thereafter may be requested. In this case, as later described, the server 5 needs to have secret keys corresponding to the plurality of public keys. Obtaining the request in step S154, the server 5 supplies the requested public key to the digital camera 1 in step S155. The digital camera 1 obtains the public key in step S134. It is to be noted that the server 5 retains a secret key corresponding to the public key. Data encrypted by this public key can be decrypted by only the corresponding secret key. As later described, this secret key is used for a process of decrypting encrypted image data.

Obtaining the public key, the digital camera 1 performs a process of step S135 at the time of transferring image data to encrypt the image data to be transferred using the obtained public key. Then, in step S136, the digital camera 1 supplies the encrypted image data to the server 5.

Obtaining the encrypted image data in step S156, the server 5 decrypts the encrypted image data using the secret key corresponding to the supplied public key in step S157.

Then, when ending the image data transfer process, the digital camera 1 performs a process of step S137 to discard the supplied public key.

As described above, the digital camera 1 encrypts image data using the first encryption system, and then transfers the image data to the server 5. It is thereby possible to improve secrecy in transferring image data. In addition, since the server 5 authenticates the digital camera 1 by the ID and the password, the server 5 can obtain image data more securely.

Figure 20:
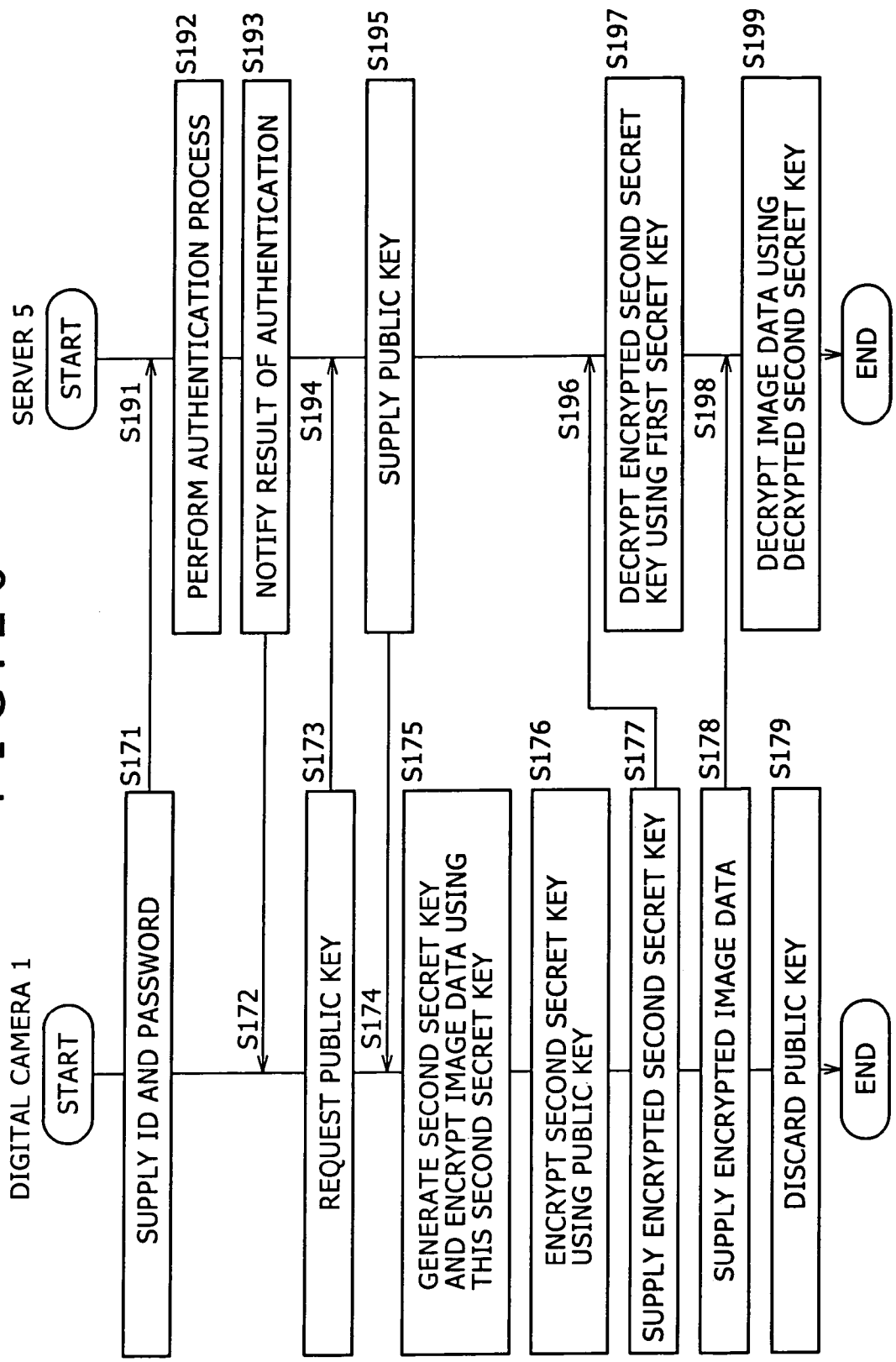
FIG. 20 is a timing chart of assistance in explaining a flow of a process of transferring image data encrypted by a second encryption system in the image processing system of FIG. 1.

FIG. 20 is a timing chart of assistance in explaining a process flow in a case of transfer of image data encrypted by a second encryption system in the image processing system of FIG. 1.

First, in step S171, the digital camera 1 supplies the ID and the password distributed in advance to the server 5 via the network 3. When obtaining the ID and the password in step S191, the server 5 in step S192 authenticates the digital camera 1 by using the ID and the password obtained.

When the authentication process is completed, the server 5 supplies a result of the authentication to the digital camera 1 in step S193. The digital camera 1 obtains the result of the authentication in step S172. When the digital camera 1 is authenticated, a connection between the digital camera 1 and the server 5 is established by these processes.

Having established the connection, the digital camera 1 requests a public key provided by the server 5 from the server 5 in step S173. Incidentally, as to the public key request, a plurality of public keys corresponding in number to that of pieces of image data to be transmitted thereafter may be requested. In this case, as later described, the server 5 needs to have secret keys corresponding to the plurality of public keys. Obtaining the request in step S194, the server 5 supplies the requested public key to the digital camera 1 in step S195. The digital camera 1 obtains the public key in step S174. It is to be noted that the server 5 retains a first secret key corresponding to the public key. Data encrypted by this public key can be decrypted by only the corresponding first secret key.

Obtaining the public key, the digital camera 1 in step S175 generates a second cryptographic key for encrypting picked-up image data, and encrypts the image data to be transferred using this second secret key. It is to be noted that the image data encrypted by the second secret key is decrypted by only the second secret key. In step S176, the digital camera 1 encrypts the second secret key using the public key. Incidentally, the second cryptographic key may be generated as a key corresponding to each picked-up image, or may be generated for one transmission unit. In step S173, a plurality of public keys corresponding in number to that of pieces of image data to be transmitted may be requested. In this case, the server 5 needs to have a plurality of first secret keys corresponding to the plurality of public keys. By combination of these keys, it is possible to use a different public key and a different second cryptographic key for each image, and thus transmit image data more securely.

Then, in step S177, the digital camera 1 preferentially supplies the encrypted second secret key to the server 5 via the network 3 together with corresponding thumbnail image data before the image data encrypted by the second secret key. The server 5 in step S196 obtains the encrypted second secret key.

Obtaining the encrypted second secret key, the server 5 in step S197 decrypts the encrypted second secret key using the first secret key corresponding to the supplied public key and retained by the server 5.

When preparation for the transfer of the image data is completed by the above-described process, the digital camera 1 in step S178 supplies the encrypted image data to the server 5. Obtaining the encrypted image data in step S198, the server 5 decrypts the encrypted image data using the decrypted second secret key in step S199. The server 5 thereby obtains the image data.

Then, when ending the image data transfer process, the digital camera 1 performs a process of step S179 to discard the public key supplied from the server 5.

As described above, the digital camera 1 encrypts image data using the second encryption system, and then transfers the image data to the server 5. It is thereby possible to further improve secrecy in transferring image data. Further, by supplying the second secret key encrypted by the obtained public key to the server 5 via the network 3 together with the corresponding thumbnail image data before the image data encrypted by the second secret key, the user can check the image data to be transmitted thereafter and also decrypt the encrypted second secret key by the first secret key retained by the server 5. Since the key for decrypting the encrypted image can be decrypted in advance before obtaining the encrypted image data, it is possible to reduce a time for the decryption process as a whole. In addition, since the server 5 authenticates the digital camera 1 by the ID and the password, the server 5 can obtain the image data more securely.

While the above description has been made of the image processing system shown in FIG. 1, that is, a case where the server 5 side (including the personal computers 8 and 9) to which image data is transferred from the digital camera 1 uses the transferred image data, the present invention is not limited to this. For example, the image processing system may be an image processing system as shown in FIG. 21, that is, an image processing system in which a company 4 is a provider that provides an image transfer service and a personal computer 231 as a client uses image data transferred from a digital camera 1.

Figure 21:
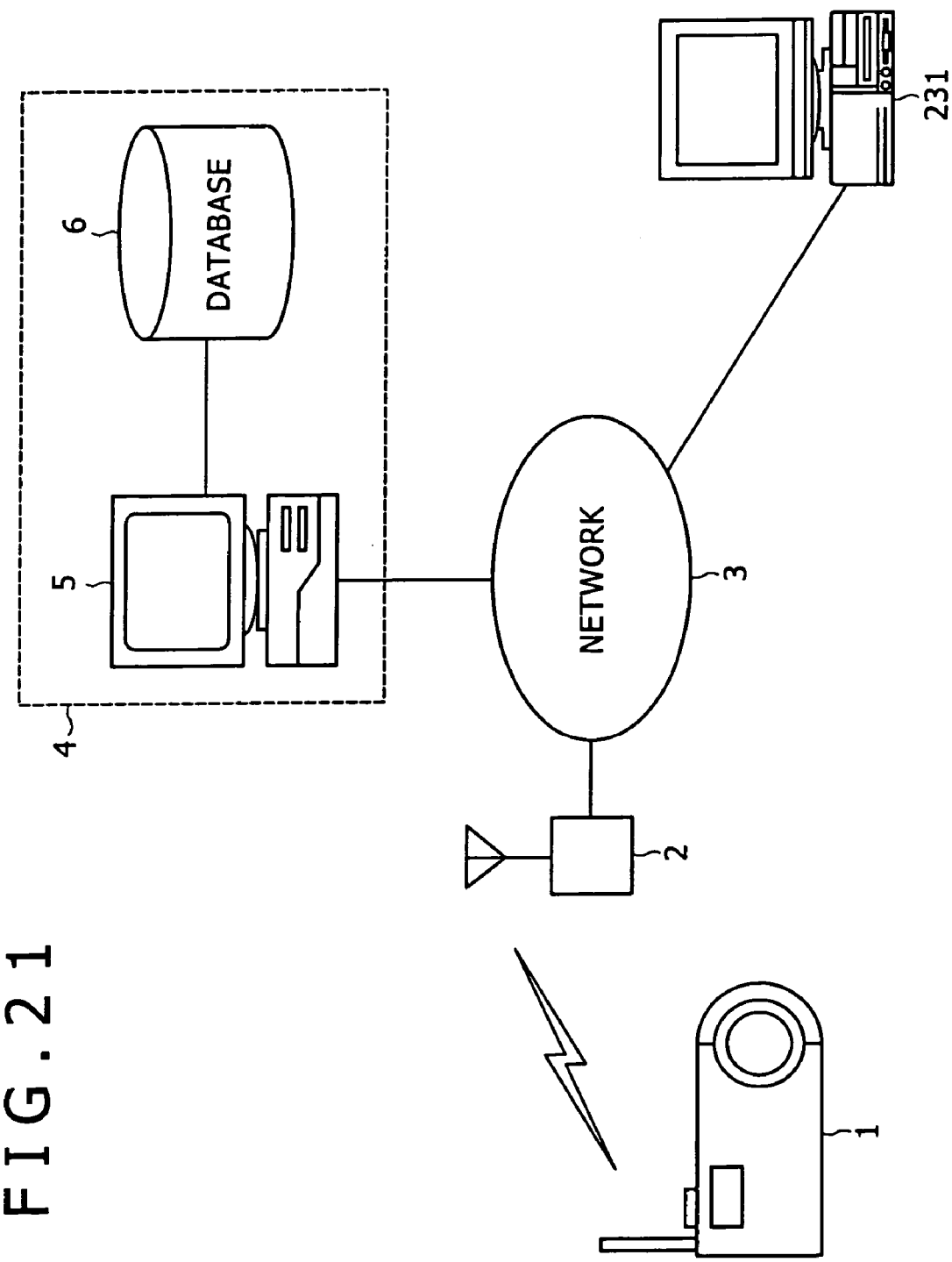
FIG. 21 is a diagram showing another example of the configuration of the image data transfer system to which the present invention is applied.

In FIG. 21, a server 5 installed in the company 4 as the provider stores thumbnail image data and image data transferred from the digital camera 1 in a database 6, and manages the thumbnail image data and the image data.

When obtaining image data obtained by image pickup in the digital camera 1, the client 231 accesses the server 5, and then obtains thumbnail image data supplied from the digital camera 1 first before corresponding image data as in the case of the above-described communication between the digital camera 1 and the server 5.

The configuration and operation of the client 231 is the same as the configuration and operation of the personal computer 8 described with reference to the block diagram of FIG. 6, and the block diagram of FIG. 6 can be applied to the client 231. Therefore, description of the configuration and operation of the client 231 will be omitted.

Figure 22:
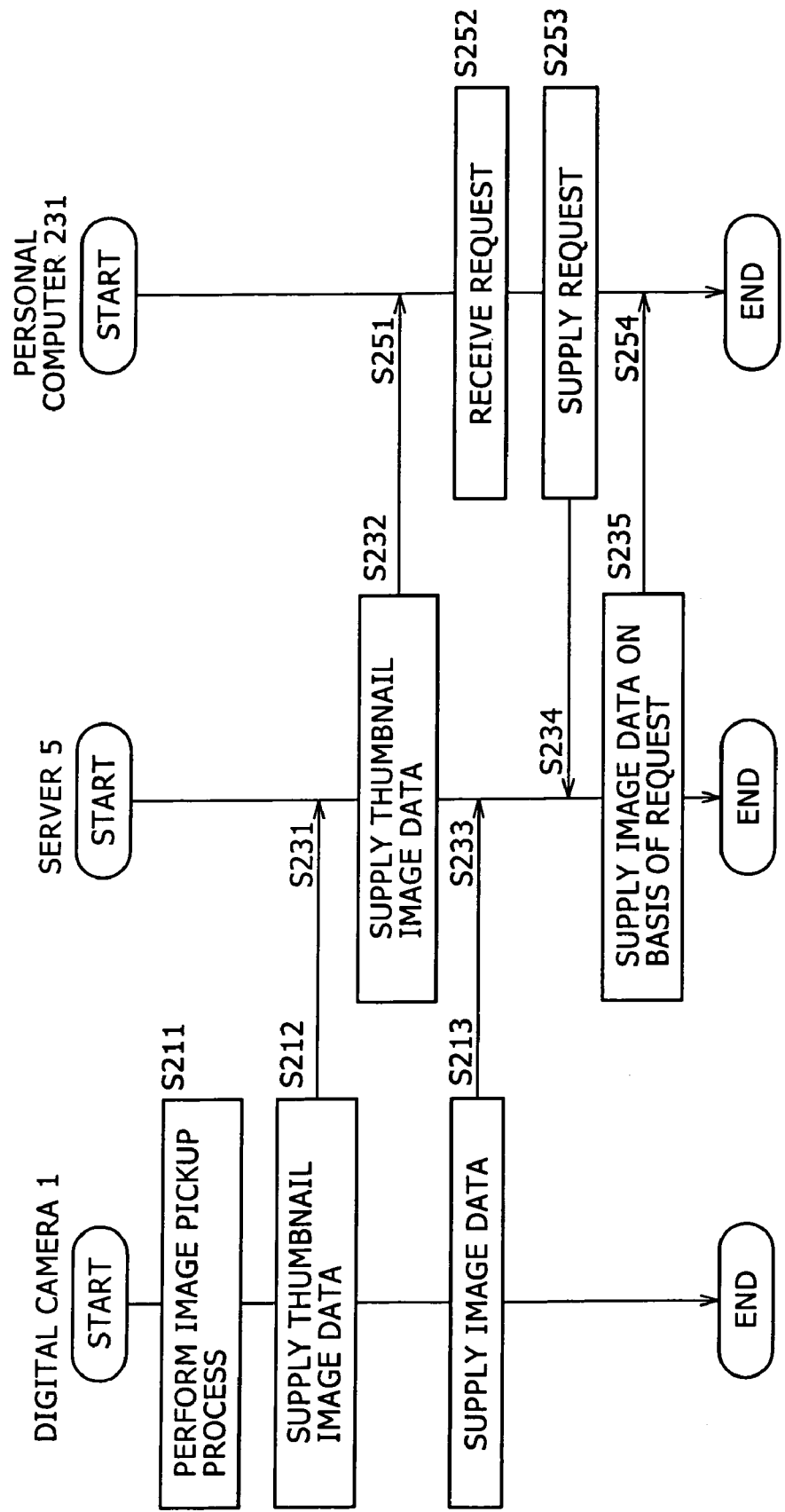
FIG. 22 is a timing chart of assistance in explaining a flow of an image data transmission process in the image processing system shown in FIG. 21.

A process flow of each apparatus in an image data transfer process of the image processing system shown in FIG. 21 will next be described with reference to a timing chart of FIG. 22.

First, in step S211, the digital camera 1 performs an image pickup process, and thereby obtains image data. Then, in step S212, the digital camera 1 generates thumbnail image data corresponding to the obtained image data, and then supplies the thumbnail image data to the server 5. In step S231, the server 5 obtains the thumbnail image data.

Obtaining the thumbnail image data, the server 5 in step S232 supplies the obtained thumbnail image data to the client 231 connected to the server 5. In step S251, the client 231 obtains the thumbnail image data, and displays corresponding thumbnail images on a display. In step S252, the client 231 receives various requests from the user.

Meanwhile, after completing the transfer of the thumbnail image data, the digital camera 1 supplies the image data to the server 5 in step S213. In step S233, the server 5 obtains the image data, and stores the image data in the database 6.

Receiving various requests from the user by the process of step S252, the client 231 supplies the received request to the server 5 in step S253. The server 5 obtains the request in step S234.

Receiving the request, the server 5 in step S235 obtains the image data stored in the database 6 and then supplies the image data to the client 231 on the basis of the request. The client 231 obtains the image data in step S254.

The process performed as described above enables the user of the client 231 to refer to thumbnail images before the transfer of the image data is completed. In addition, since the user of the client 231 can make various requests at the time of referring to the thumbnail images, the user can selectively obtain the image data, and thereby reduce a load necessary for the transfer process.

Figure 23:
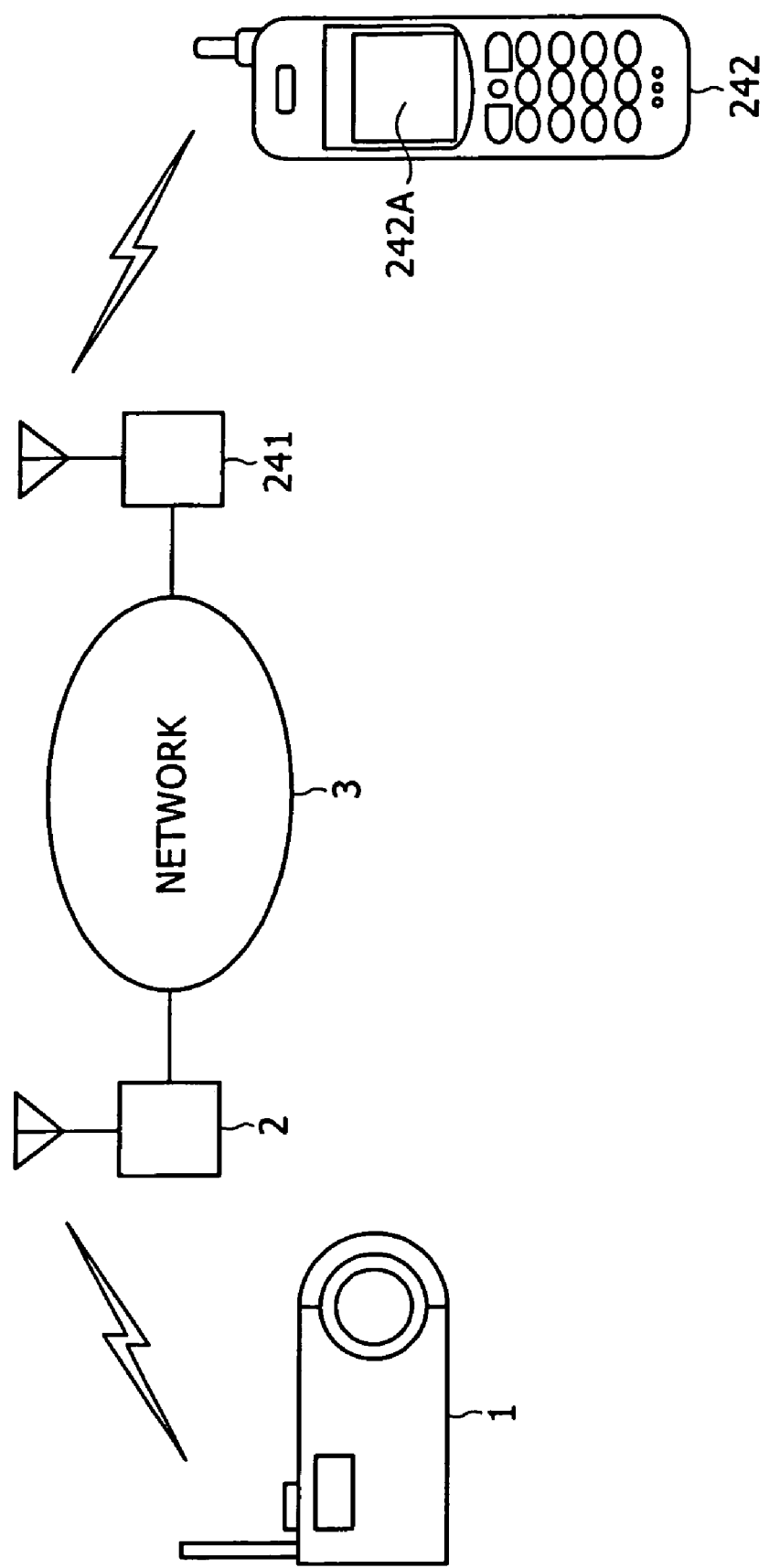
FIG. 23 is a diagram showing a further example of the configuration of the image data transfer system to which the present invention is applied.

While in the above description, the digital camera 1 transfers image data to the server 5, the present invention is not limited to this. For example, as shown in FIG. 23, the digital camera 1 may transfer image data to a portable telephone 242 connected via a base station 241.

In this case, the portable telephone 242 performs the same process as the server 5. Thumbnail images corresponding to thumbnail image data transferred preferentially before image data are displayed on a display 242A provided in the portable telephone 242.

Figure 24:
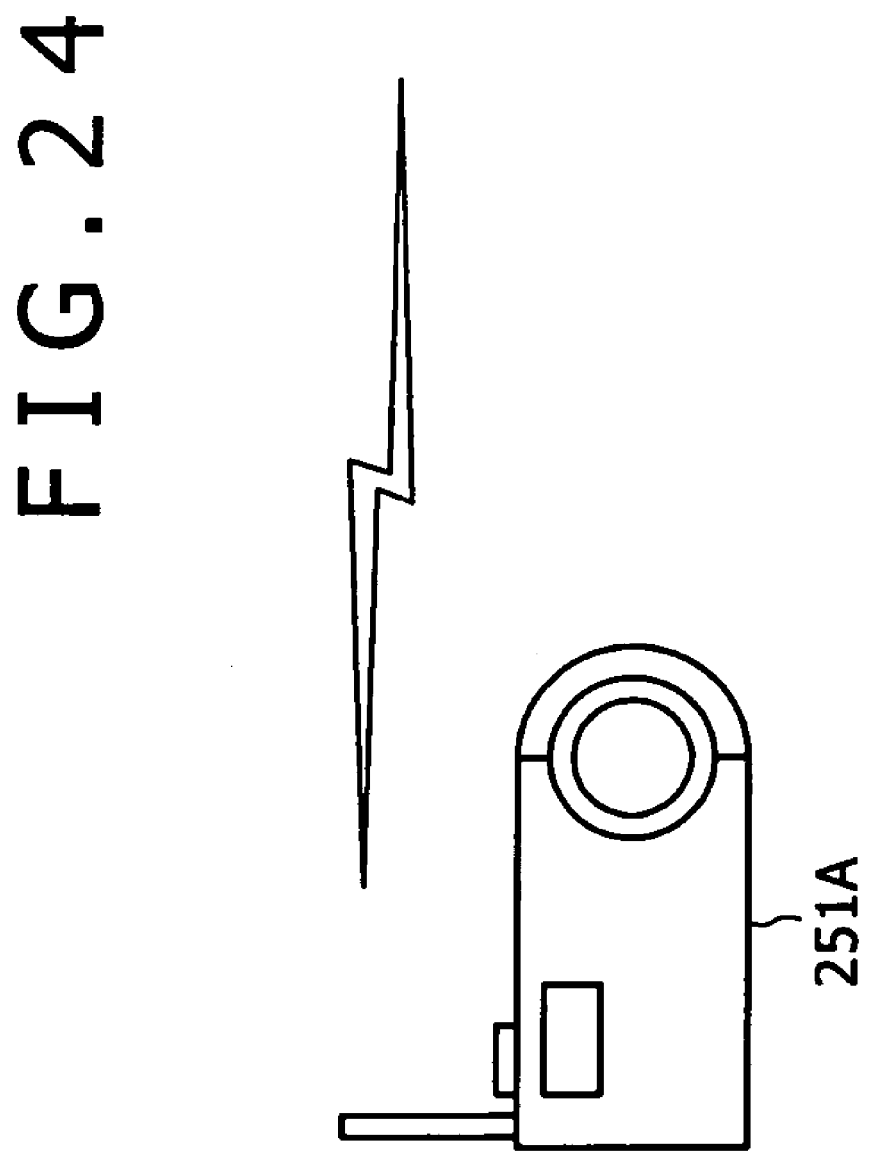
FIG. 24 is a diagram showing a further example of the configuration of the image data transfer system to which the present invention is applied.

In addition to this, image data may be transferred between digital cameras as shown in FIG. 24. In FIG. 24, image data is transferred directly between two digital cameras 251A and 251B that have the same configuration as the digital camera 1 and perform the same operation as the digital camera 1 without an intervention of the network 3. Also in this case, thumbnail image data is transferred first before image data.

Further, though not shown, the digital camera 1 may have a communication unit for performing wire communication and be connected to the network 3 or an apparatus as a destination of transfer via a cable.

While in the above description, thumbnail image data is transferred piece by piece, and whether a preferential process such as the image pickup process or the like is performed is determined at the time of transfer of each piece of thumbnail image data, the present invention is not limited to this, and thumbnail image data may be transferred in any unit. For example, a plurality of pieces of thumbnail image data before transfer may be transmitted en bloc in one file. Further, the file including the plurality of pieces of thumbnail image data en bloc may be transmitted after being divided into predetermined sizes or a predetermined number of files.

Incidentally, when the digital camera 1 receives a request for image data from the server 5, the digital camera 1 may transfer the specified image data preferentially even when thumbnail image data is being transferred. Thereby, the user of the server 5 can select a desired thumbnail image from thumbnail images displayed on the display and request the transfer of corresponding image data even while thumbnail image data is being transferred sequentially. Also in other cases, the digital camera 1 may be able to transfer arbitrary image data preferentially before thumbnail image data under a predetermined condition.

Further, while the digital camera has been described above as a device for transferring image data, the present invention is not limited to this. For example, the present invention is widely applicable to electronic devices such as portable telephones having a camera, digital video cameras having a communication function, and PDAs having a camera.

The series of processes described above can be carried out not only by hardware but also by software. When the series of processes is to be carried out by software, a program constituting the software is installed from a recording medium onto a computer that is incorporated in special hardware, or, for example, a general-purpose personal computer that can perform various functions by installing various programs thereon.

As shown in FIG. 3, the recording medium storing the program that is installed on the computer and is in a state of being executable by the computer is formed by a packaged medium comprising the magnetic disk 64 (including flexible disks), the optical disk 65 (including CD-ROM (Compact Disc-Read Only Memory) and DVD (Digital Versatile Disc)), the magneto-optical disk 66 (including MD (Mini-Disc) (trademark)), the semiconductor memory 67 or the like, or the recording medium is formed by the ROM 52, the storage unit 55 or the like, which stores the program temporarily or permanently. The program is stored onto the recording medium via an interface such as a router, a modem or the like, using a wire or wireless communication medium such as a public line network, a local area network, the Internet, or another network, or digital satellite broadcasting, as required.

It is to be noted that in the present specification, the steps describing the program stored on the recording medium include not only processes carried out in time series in the described order but also processes carried out in parallel or individually and not necessarily in time series.

As described above, according to the present invention, it is possible to supply image data to another apparatus. In particular, it is possible to transfer a large amount of image data to another apparatus efficiently.

The invention claimed is:

1. An image processing system, comprising:
an image pickup device for transferring image data obtained by picking up an image of a subject; and
an image processing apparatus for obtaining the transferred image data;
wherein the image pickup device includes:
    image pickup means for picking up the image of the subject and generating the image data,
    generating means for generating representative image data representing the image data generated by the image pickup means, and
    supplying means for supplying the representative image data and the image data to the image processing apparatus, the representative image data being supplied preferentially with respect to the image data so that upon the generating means generating new representative image data representing new image data generated from a newly picked up image, the supplying means interrupts the supplying of the image data to the image processing apparatus, supplies the new representative image data to the image processing apparatus, and then resumes the supplying of the image data to the image processing apparatus after completing the supplying of the new representative image data; and
the image processing apparatus includes:
    obtaining means for obtaining the representative image data and the image data supplied from the image pickup device,
    displaying means for displaying the representative image data obtained by the obtaining means, and
    storing means for storing the representative image data and the image data obtained by the obtaining means in association with each other.

2. An image processing system, comprising:
an image pickup device for transferring image data obtained by picking up an image of a subject;

an image managing apparatus for managing the transferred image data; and an image processing apparatus for obtaining the image data managed by the image managing apparatus;

wherein the image pickup device includes:
image pickup means for picking up the image of the subject and generating the image data,
generating means for generating representative image data representing the image data generated by the image pickup means, and
first supplying means for supplying the representative image data and the image data to the image managing apparatus, the representative image data being supplied preferentially with respect to the image data so that upon the generating means generating new representative image data representing new image data generated from a newly picked up image, the first supplying means interrupts the supplying of the image data to the image managing apparatus, supplies the new representative image data to the image managing apparatus, and then resumes the supplying of the image data to the image managing apparatus after completing the supplying of the new representative image data;

the image managing apparatus includes:
first obtaining means for obtaining the representative image data and the image data supplied from the image pickup device,
managing means for managing the representative image data and the image data obtained by the first obtaining means in association with each other, and
second supplying means for supplying the representative image data and the image data to the image processing apparatus, the representative image data being supplied preferentially with respect to the image data so that upon the first obtaining means obtaining new representative image data representing new image data generated from a newly picked up image, the second supplying means interrupts the supplying of the image data to the image processing apparatus, supplies the new representative image data to the image processing apparatus, and then resumes the supplying of the image data to the image processing apparatus after completing the supplying of the new representative image data; and the image processing apparatus includes:
second obtaining means for obtaining the representative image data and the image data supplied from the image managing apparatus,
displaying means for displaying the representative image data obtained by the second obtaining means, and
storing means for storing the representative image data and the image data obtained by the second obtaining means in association with each other.

3. An image pickup device, comprising:
image pickup means for picking up an image of a subject and generating image data;
generating means for generating representative image data representing the image data generated by the image pickup means; and
supplying means for supplying the representative image data and the image data to another apparatus, the representative image data being supplied preferentially supplying means for supplying the representative image data and the image data to the image processing apparatus, the representative image data being supplied preferentially with respect to the image data so that upon the generating means generating new representative image data representing new image data generated from a newly picked up image, the supplying means interrupts the supplying of the image data to the another apparatus, supplies the new representative image data to the another apparatus, and then resumes the supplying of the image data to the another apparatus after completing the supplying of the new representative image data.

4. The image pickup device as set forth in claim 3, wherein:
when the image pickup means generates new image data while the supplying means is supplying the image data to the another apparatus, the generating means generates new representative image data representing the new image data, and the supplying means preferentially supplies the new representative image data to the another apparatus before the image data being supplied.

5. The image pickup device as set forth in claim 3, further comprising receiving means for receiving control information on supply of the image data,
wherein the supplying means supplies the image data to the another apparatus based on the control information received by the receiving means.

6. The image pickup device as set forth in claim 4, wherein:
the supplying means supplies related information on the image data to the another apparatus together with the representative image data or the new representative image data.

7. The image pickup device as set forth in claim 6, further comprising:
receiving means for receiving a first cryptographic key supplied by the another apparatus;
cryptographic key generating means for generating a second cryptographic key for encrypting the image data generated by said image pickup means;
first encrypting means for generating first encrypted data by encrypting the image data generated by the image pickup means using the second cryptographic key; and
second encrypting means for generating second encrypted data by encrypting the second cryptographic key using the first cryptographic key;
wherein the related information on the image data is the second encrypted data.

8. An image pickup method, comprising:
generating image data obtained by picking up an image of a subject;
generating representative image data representing the generated image data; and
controlling supply so as to supply the representative image data and the image data to another apparatus, the representative image data being supplied preferentially with respect to the image data so that upon the generation of new representative image data representing new image data generated from a newly picked up image, the supplying of the image data to the another apparatus is interrupted, the new representative image data is supplied to the another apparatus, and then the supplying of the image data to the another apparatus is resumed after completing the supplying of the new representative image data.

9. The image pickup method as set forth in claim 8, wherein:
when the image data generating step generates new image data while the generated image data is being supplied to the another apparatus, the representative image data generating step generates new representative image data representing the new image data, and the supply controlling step controls the supply so as to preferentially supply the new representative image data to the another apparatus before the image data being supplied.

10. The image pickup method as set forth in claim 8, further comprising receiving control information on supply of the image data,
wherein the supply controlling step controls the supply so as to supply the image data to the another apparatus based on the control information.

11. The image pickup method as set forth in claim 9, wherein:
the supply controlling step controls the supply so as to supply related information on the image data to the another apparatus together with the representative image data or the new representative image data.

12. The image pickup method as set forth in claim 11, further comprising:
receiving a first cryptographic key supplied by the another apparatus;
generating a second cryptographic key for encrypting the generated image data;
generating first encrypted data by encrypting the generated image data using the second cryptographic key; and
generating second encrypted data by encrypting the second cryptographic key using the first cryptographic key;
wherein the related information on the image data is the second encrypted data.

13. A recording medium recorded with a computer readable program for performing an image pickup method, the method comprising:
generating image data obtained by picking up an image of a subject;
generating representative image data representing the generated image data; and
controlling supply so as to supply the representative image data and the image data to another apparatus, the representative image data being supplied preferentially with respect to the image data so that upon the generation of new representative image data representing new image data generated from a newly picked up image, the supplying of the image data to the another apparatus is interrupted, the new representative image data is supplied to the another apparatus, and then the supplying of the image data to the another apparatus is resumed after completing the supplying of the new representative image data.

14. An image processing system, comprising:
an image pickup device operable to transfer image data obtained by picking up an image of a subject; and
an image processing apparatus operable to obtain the transferred image data;
the image pickup device including:
an image pickup unit operable to pick up the image of the subject and generate the image data,
a generator operable to generate representative image data representing the image data generated by the image pickup unit, and
a supplying unit operable to supply the representative image data and the image data to the image processing apparatus, the representative image data being supplied preferentially with respect to the image data so that upon the generator generating new representative image data representing new image data generated from a newly picked up image, the supplying unit interrupts the supplying of the image data to the image processing apparatus, supplies the new representative image data to the image processing apparatus, and then resumes the supplying of the image data to the image processing apparatus after completing the supplying of the new representative image data; and
the image processing apparatus including:
an obtaining unit operable to obtain the representative image data and the image data supplied from the image pickup devices,
a displaying unit operable to display the representative image data obtained by the obtaining unit, and
a storage unit operable to store the representative image data and the image data obtained by the obtaining unit in association with each other.

15. An image processing system, comprising:
an image pickup device operable to transfer image data obtained by picking up an image of a subject;
an image managing apparatus operable to manage the transferred image data; and
an image processing apparatus operable to obtain the image data managed by the image managing apparatus;
the image pickup device including:
an image pickup unit operable to pick up the image of the subject and generate the image data,
a generator operable to generate representative image data representing the image data generated by the image pickup unit, and
a first supplying unit operable to supply the representative image data and the image data to the image managing apparatus, the representative image data being supplied preferentially with respect to the image data so that upon the generator generating new representative image data representing new image data generated from a newly picked up image, the first supplying unit interrupts the supplying of the image data to the image managing apparatus, supplies the new representative image data to the image managing apparatus, and then resumes the supplying of the image data to the image managing apparatus after completing the supplying of the new representative image data;
the image managing apparatus including:
a first obtaining unit operable to obtain the representative image data and the image data supplied from the image pickup device,
a managing unit operable to manage the representative image data and the image data obtained by the first obtaining unit in association with each other, and
a second supplying unit operable to supply the representative image data and the image data to the image processing apparatus, the representative image data being supplied preferentially with respect to the image data so that upon the first obtaining unit obtaining new representative image data representing new image data generated from a newly picked up image, the second supplying unit interrupts the supplying of the image data to the image processing apparatus, supplies the new representative image data to the image processing apparatus, and then resumes the supplying of the image data to the image processing apparatus after completing the supplying of the new representative image data; and
the image processing apparatus including:
a second obtaining unit operable to obtain the representative image data and the image data supplied from the image managing apparatus,
a displaying unit operable to display the representative image data obtained by the second obtaining unit, and a storage unit operable to store the representative image data and the image data obtained by the second obtaining unit in association with each other.

16. An image pickup device, comprising:

an image pickup unit operable to pick up an image of a subject and generate image data;

a generator operable to generate representative image data representing the image data generated by the image pickup unit; and a supplying unit operable to supply the representative image data and the image data to another apparatus, the representative image data being supplied preferentially with respect to the image data so that upon the generator generating new representative image data representing new image data generated from a newly picked up image, the supplying unit interrupts the supplying of the image data to the another apparatus, supplies the new representative image data to the another apparatus, and then resumes the supplying of the image data to the another apparatus after completing the supplying of the new representative image data.

* * * * *